(12) United States Patent
Blatherwick et al.

(10) Patent No.: US 6,269,395 B1
(45) Date of Patent: Jul. 31, 2001

(54) METHOD AND SYSTEM IN A COMPUTER-BASED SYSTEM FOR PROVIDING ACCESS TO SERVICES ASSOCIATED WITH DIFFERENT ACCESS POINTS

(75) Inventors: Peter L. Blatherwick, Ottawa; Carol A. Mason, Richmond, both of (CA); Christian Liao, Hastings-on-Hudson, NY (US); Kenneth J. Liang, Kananta; Kenneth M. Orford, Nepean, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/216,935

(22) Filed: Dec. 21, 1998

(51) Int. Cl.$^7$ ................................................ G06F 13/00
(52) U.S. Cl. .................... 709/219; 709/227; 709/228; 709/328; 713/202
(58) Field of Search .................................... 709/217, 219, 709/223, 225, 227, 228, 229, 313, 328, 329; 713/201, 202

(56) References Cited

U.S. PATENT DOCUMENTS

| | | | |
|---|---|---|---|
| 5,689,638 | | 11/1997 | Sadovsky ................................ 395/186 |
| 5,875,296 | * | 2/1999 | Shi et al. ............................. 395/188.01 |
| 6,092,196 | * | 7/2000 | Reiche ................................... 713/200 |
| 6,115,040 | * | 9/2000 | Bladow et al. .......................... 345/335 |
| 6,205,480 | * | 3/2001 | Broadhurst et al. ................... 709/225 |

* cited by examiner

Primary Examiner—Viet D. Vu

(57) ABSTRACT

A computer program and computer-based system provide a user interface listing services associated with one or more access points or service providers. If a user selects a service associated with a first access point, the program, without further input from the user, connects with the access point, provides the access point with the user's password and user ID, if necessary, as well as access point specific network configuration parameters and launches the selected service. If the user then selects another service associated with the same access point, the program, without further input from the user, launches the other service. If the user selects a service associated with a second access point, if a second communication link is available, the program, without further input from the user, connects with the second access point, provides any necessary password, user ID and network configuration parameters to the access point and launches the service. If a second communication link is unavailable, the program queries the user as to whether the user would prefer to launch the service from the second access point, or maintain connection to the first access point. If the user wishes to launch the service from the second access point, without further input from the user, the program disconnects from the first access point, connects to the second access point and provides the second access point with any necessary password, user ID and network configuration parameters and launches the service from the second access point.

22 Claims, 46 Drawing Sheets

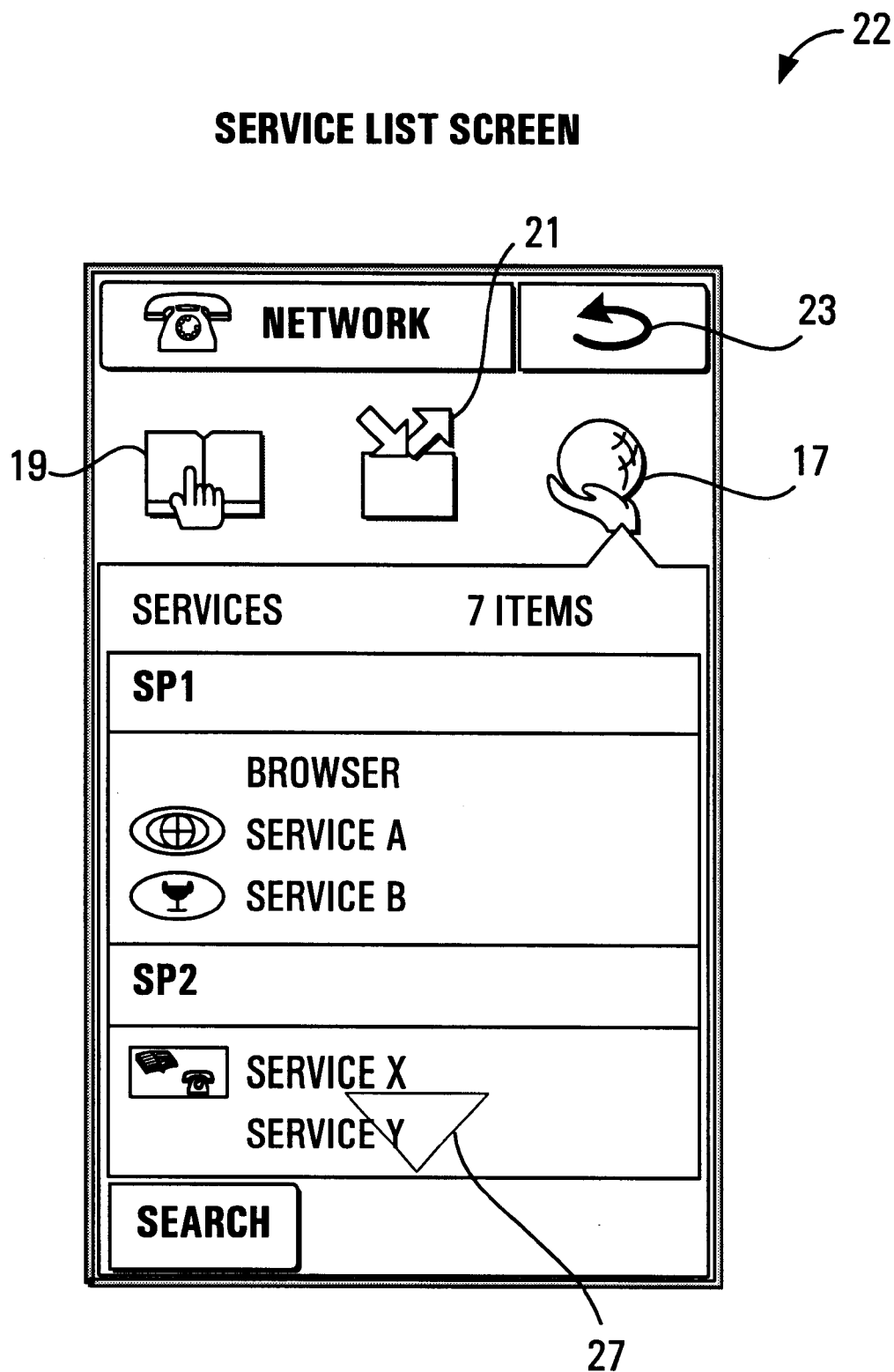
FIG. 3.1

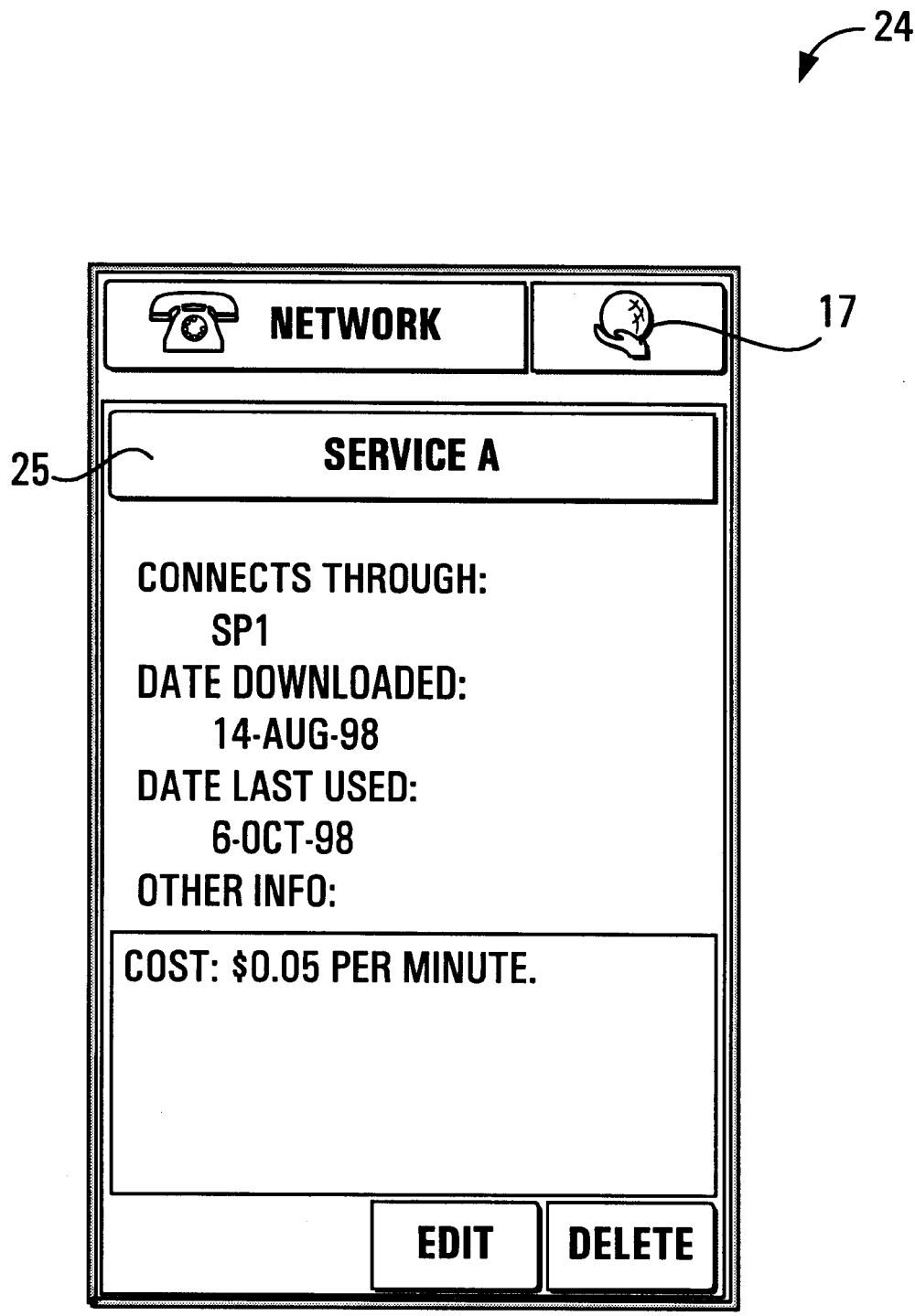
FIG. 3.2.1

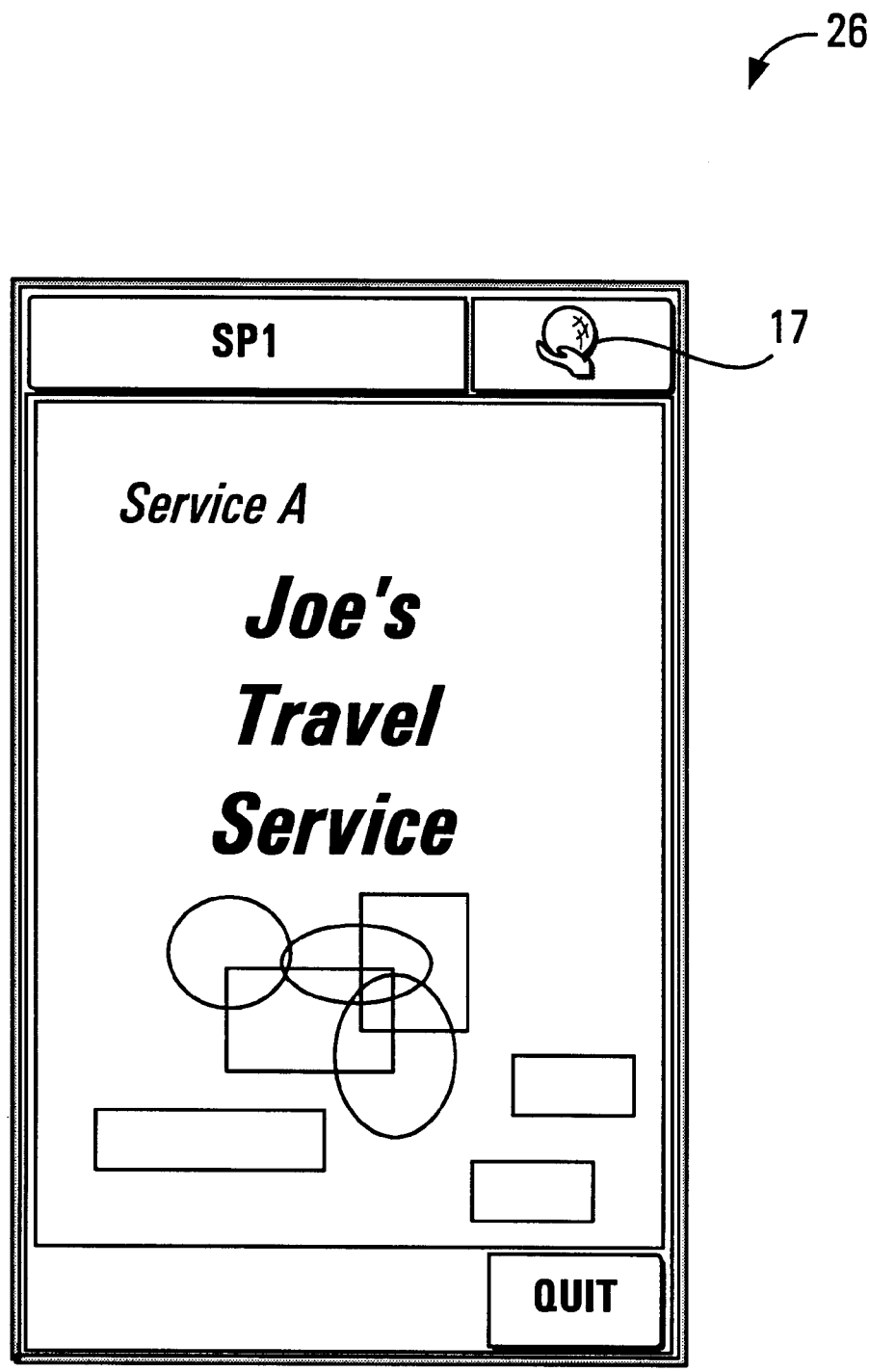
FIG. 3.2.2

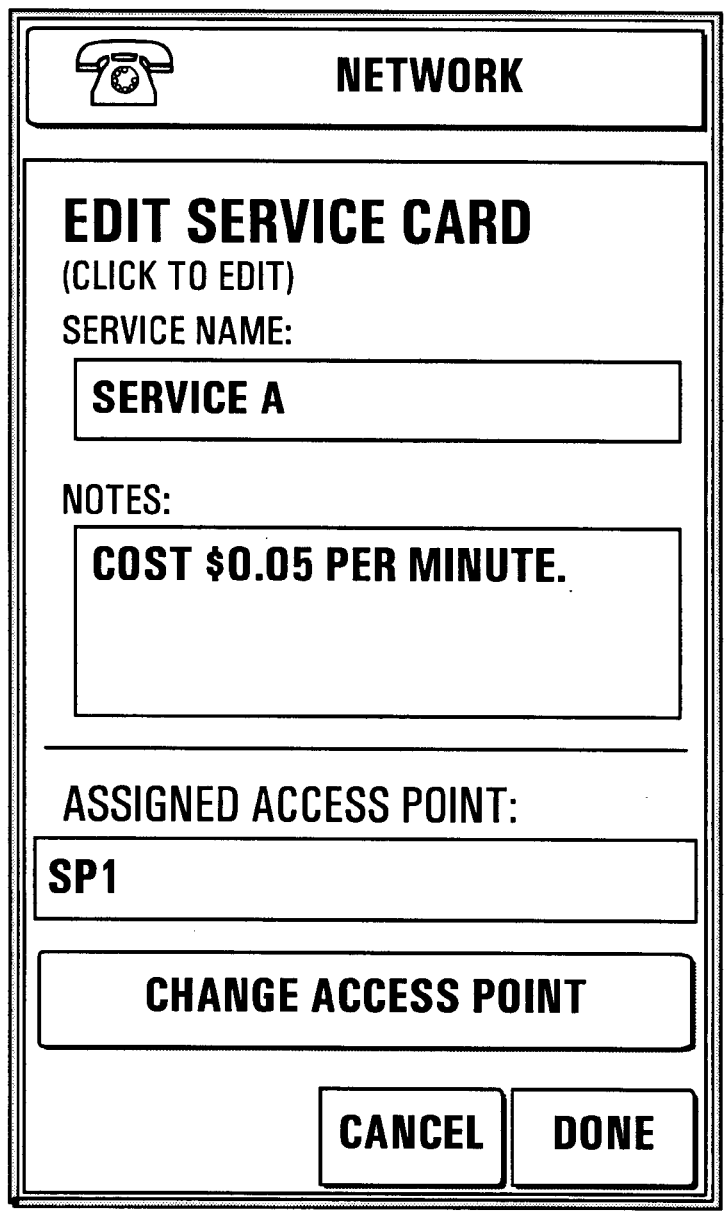
FIG. 3.3.1

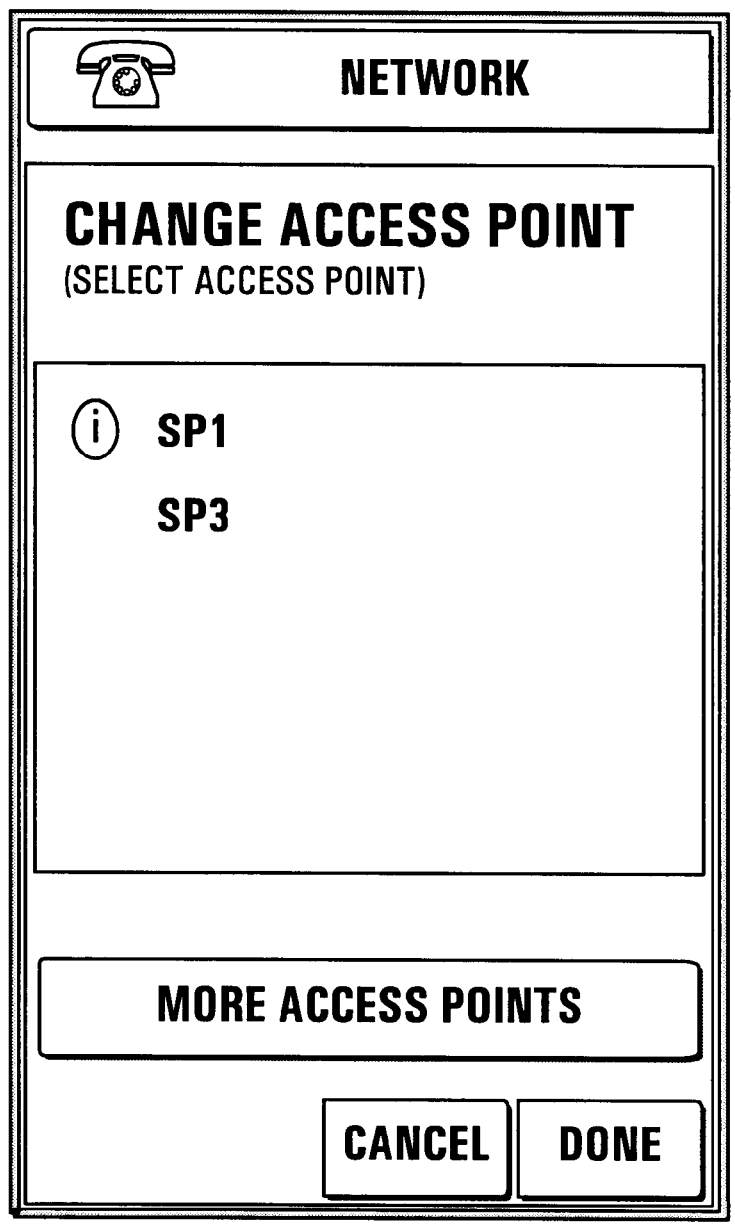
FIG. 3.3.2

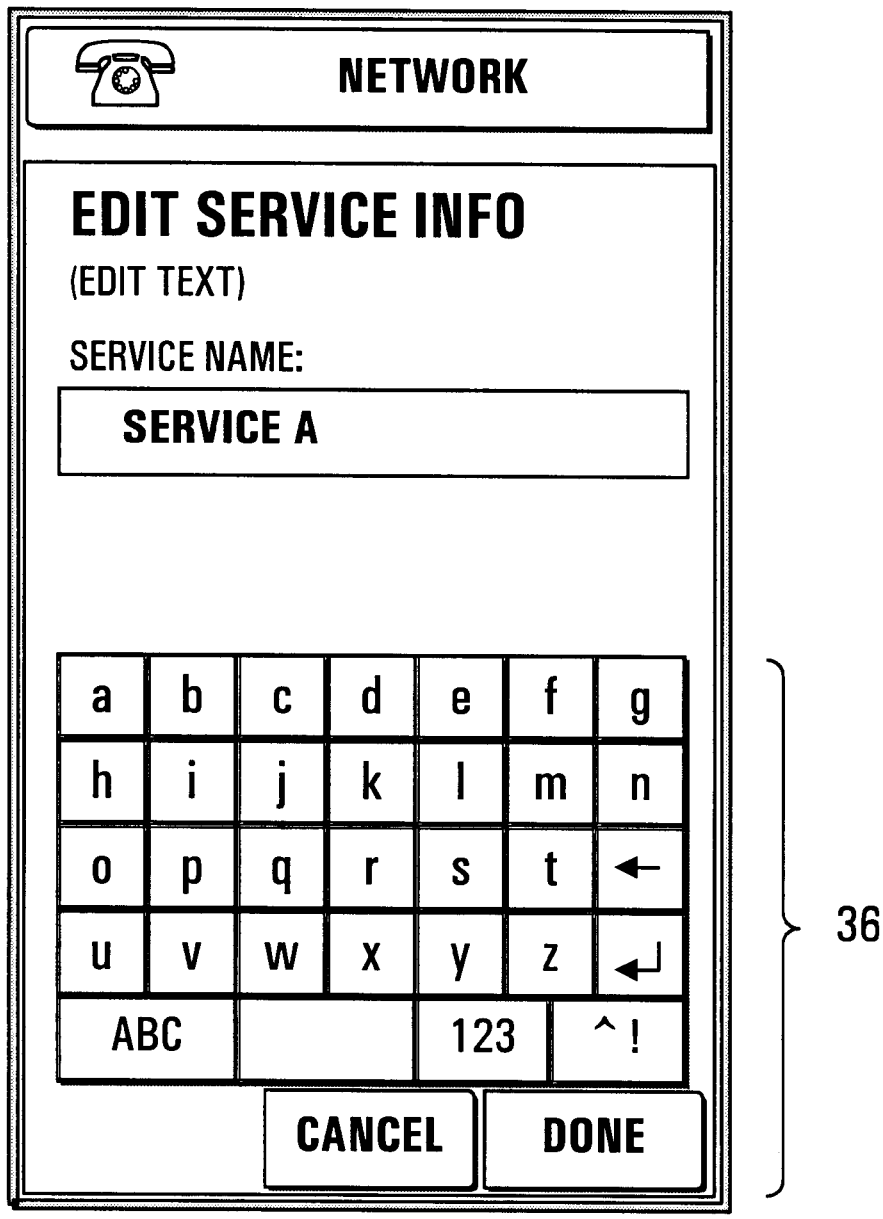
FIG. 3.3.3

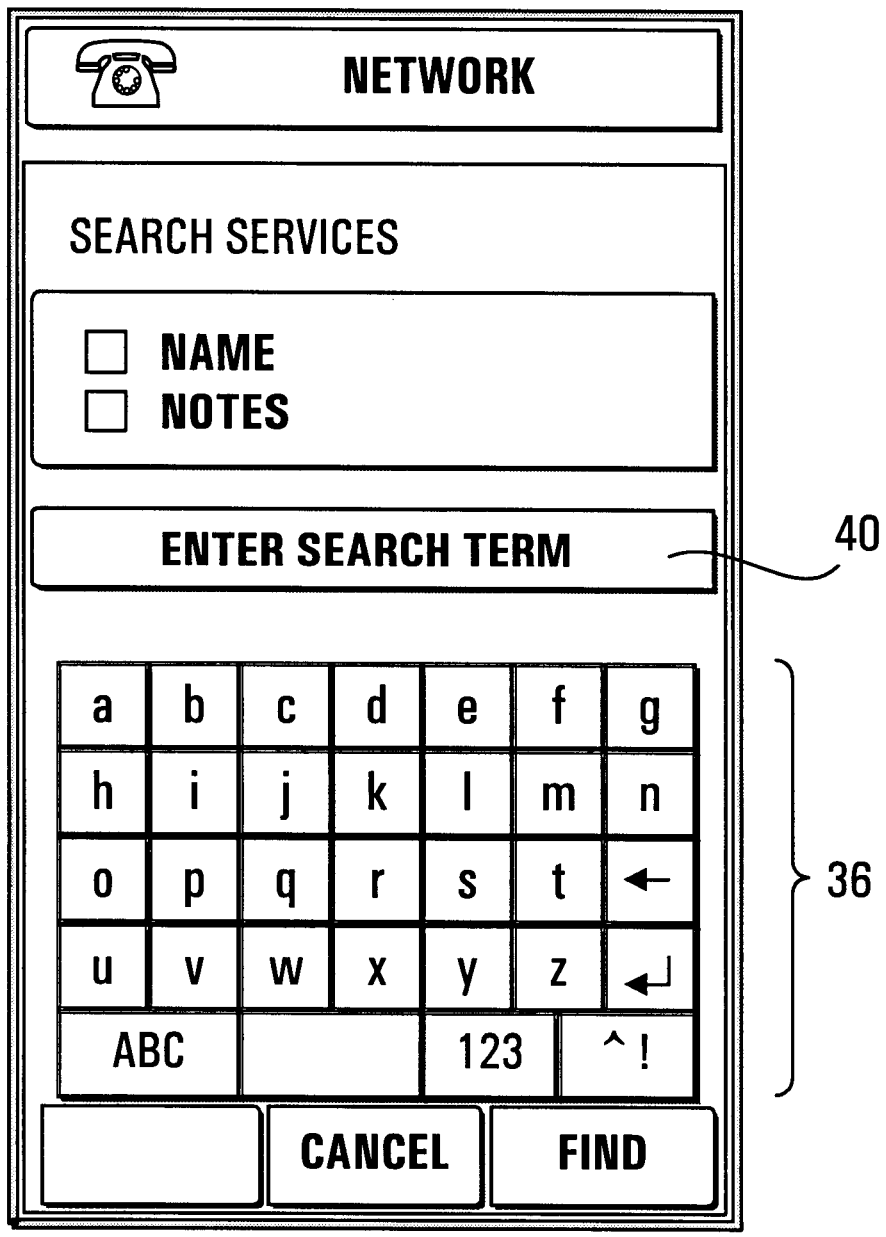
FIG. 4.1

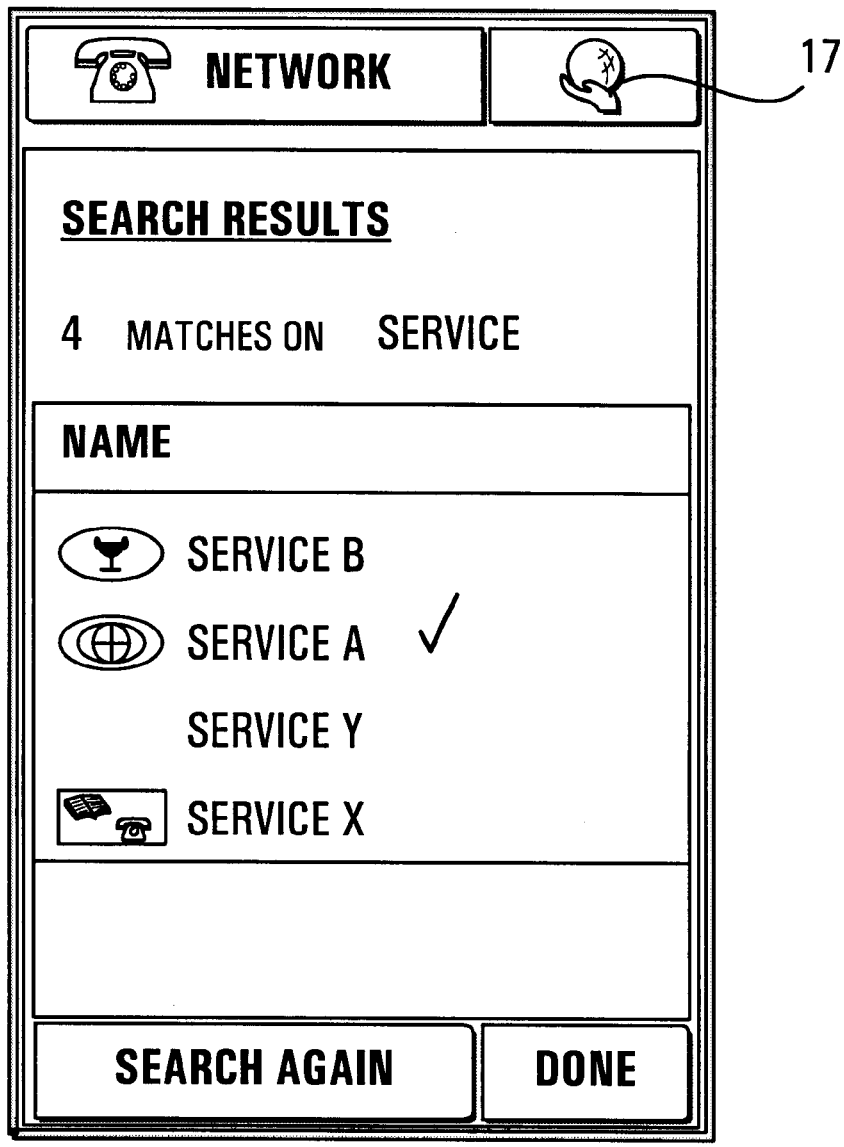
FIG. 4.2

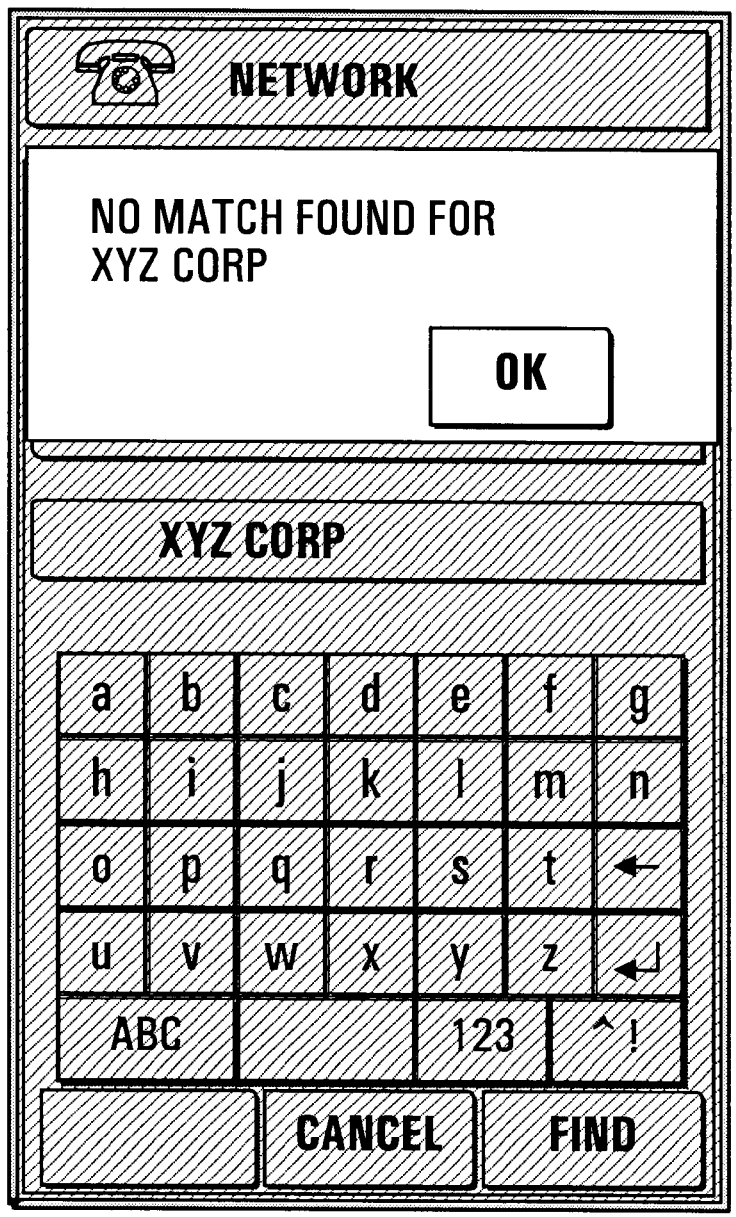
FIG. 4.3

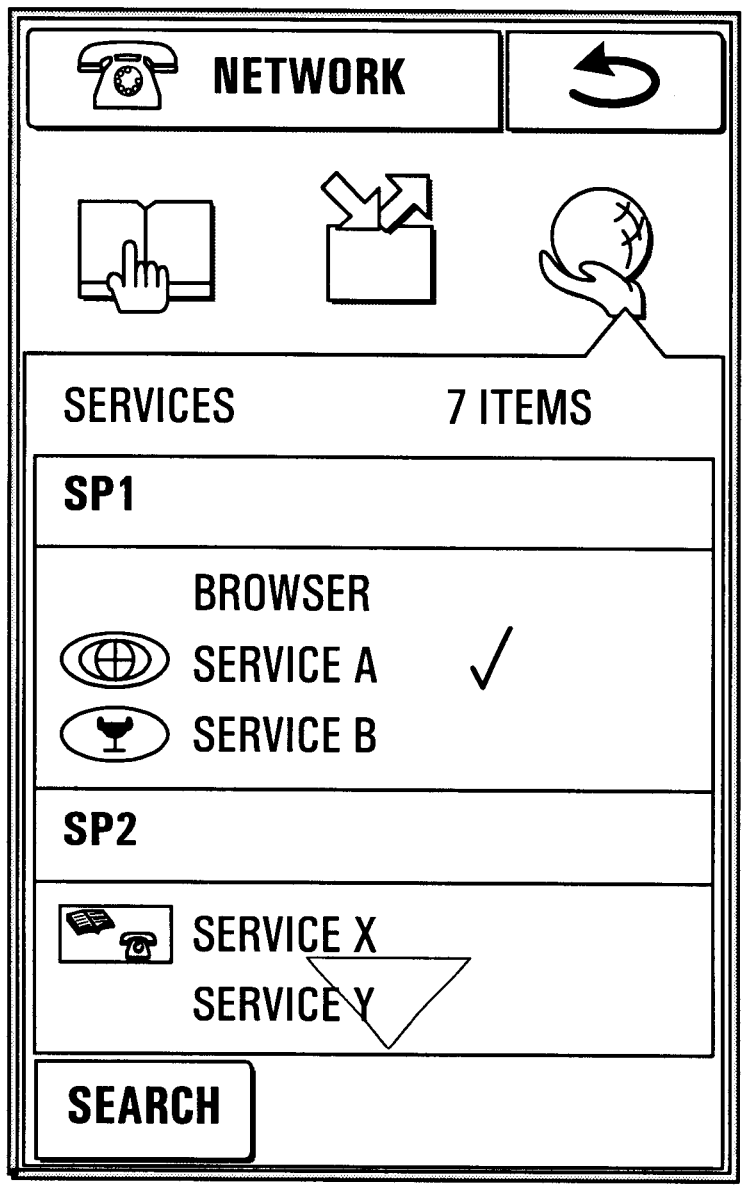
FIG. 7.1

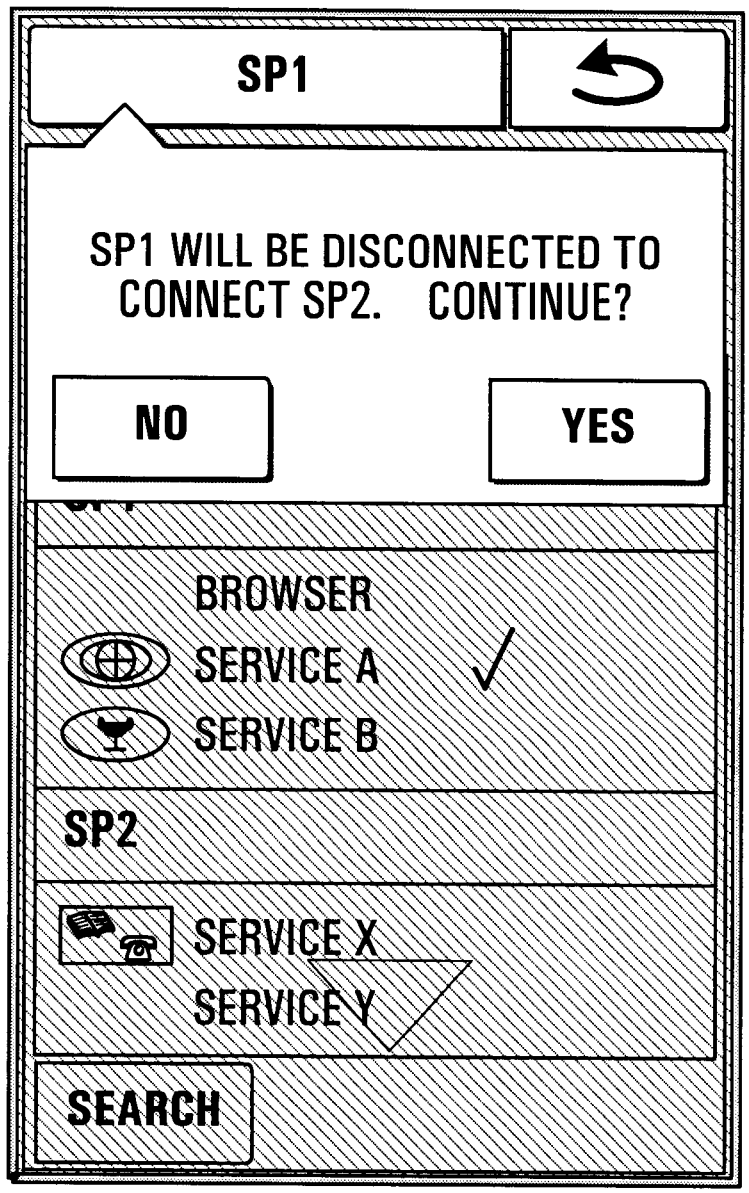
FIG. 7.2.1

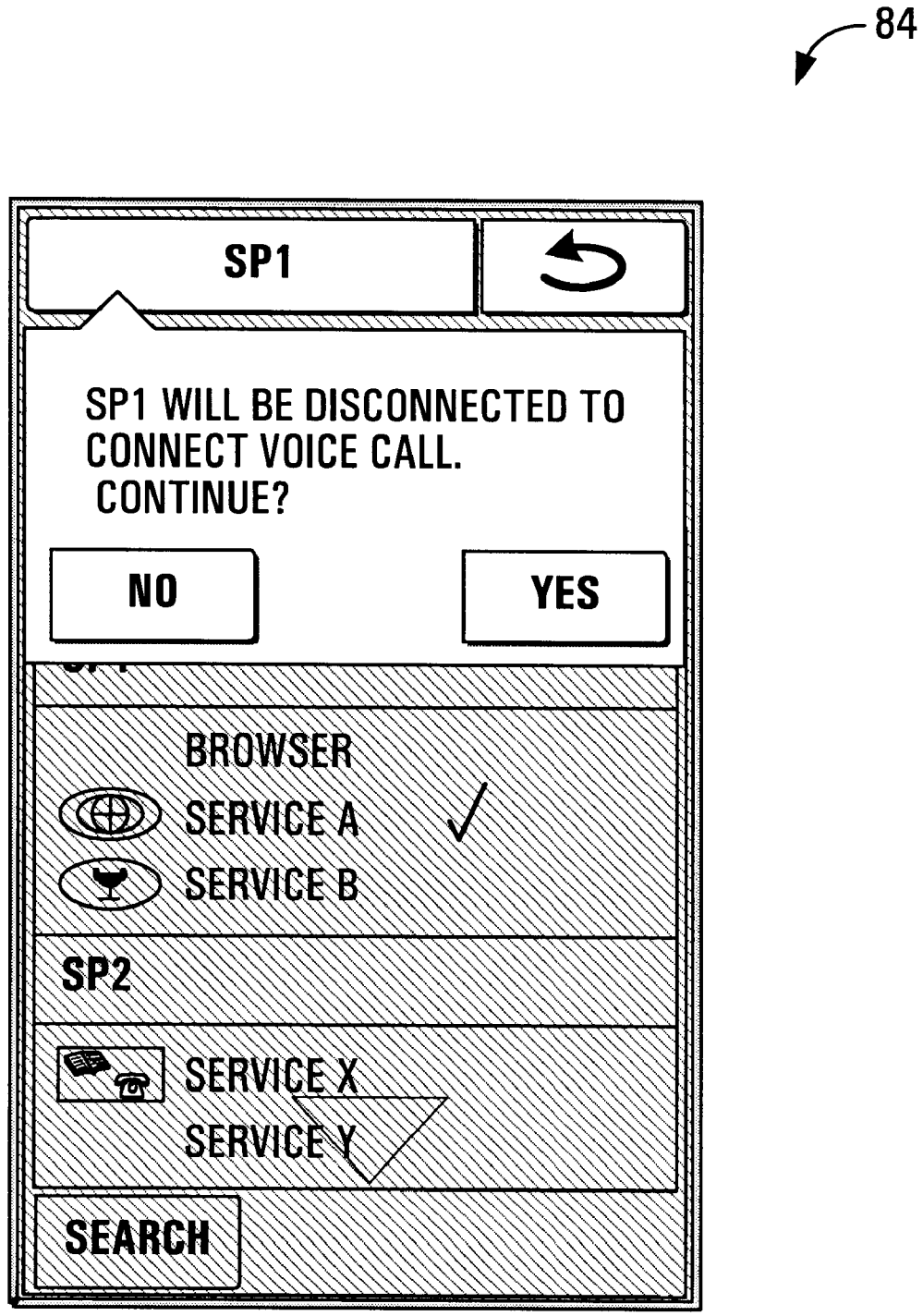
FIG. 7.2.2

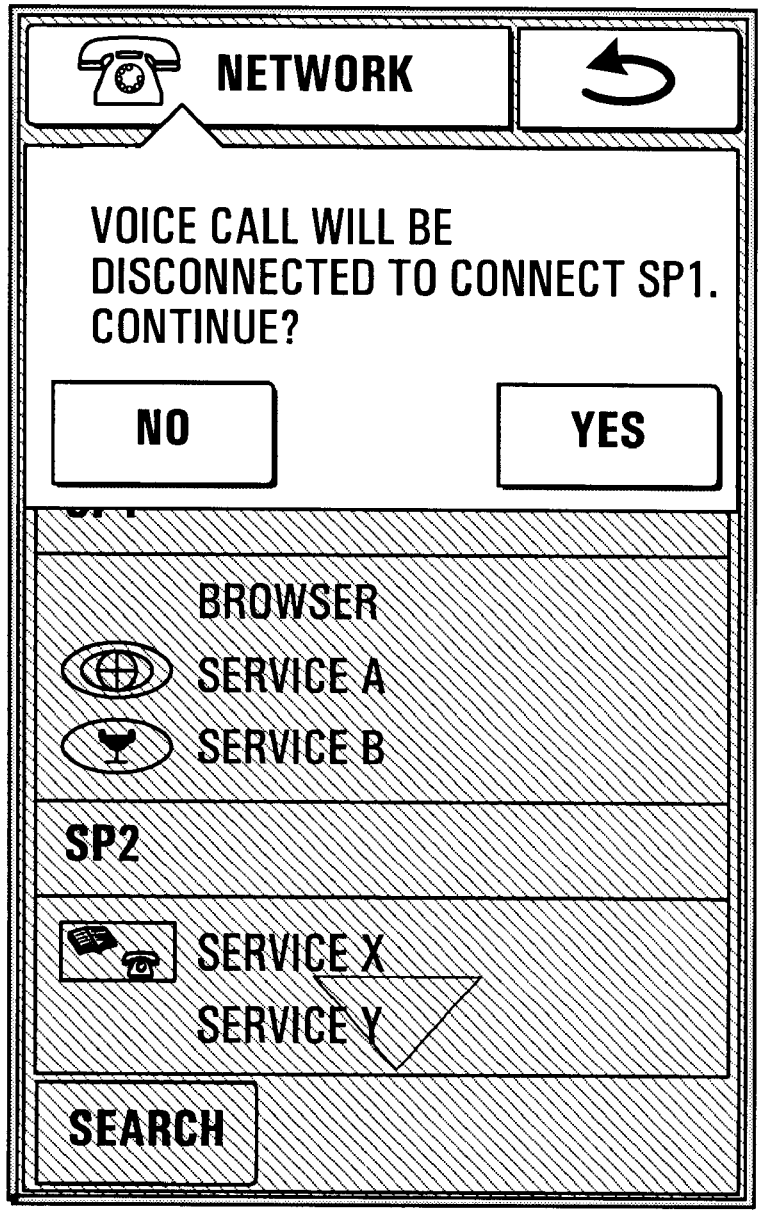
FIG. 7.2.3

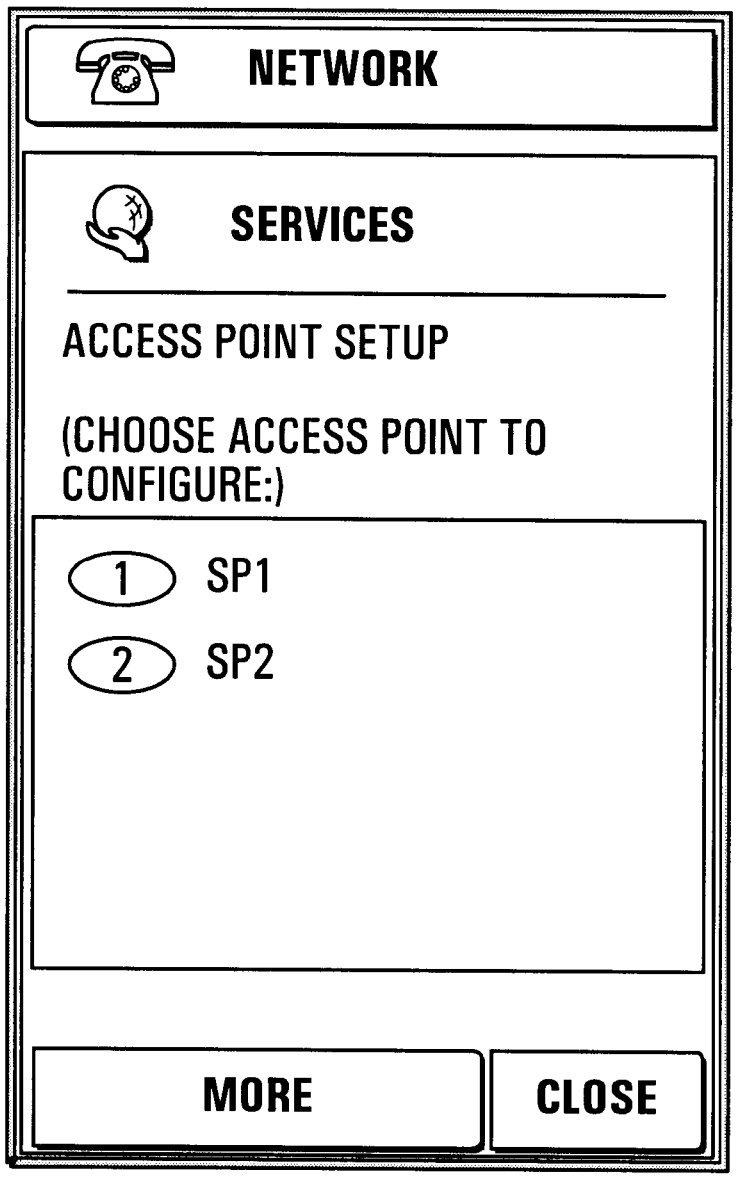
FIG. 8.1

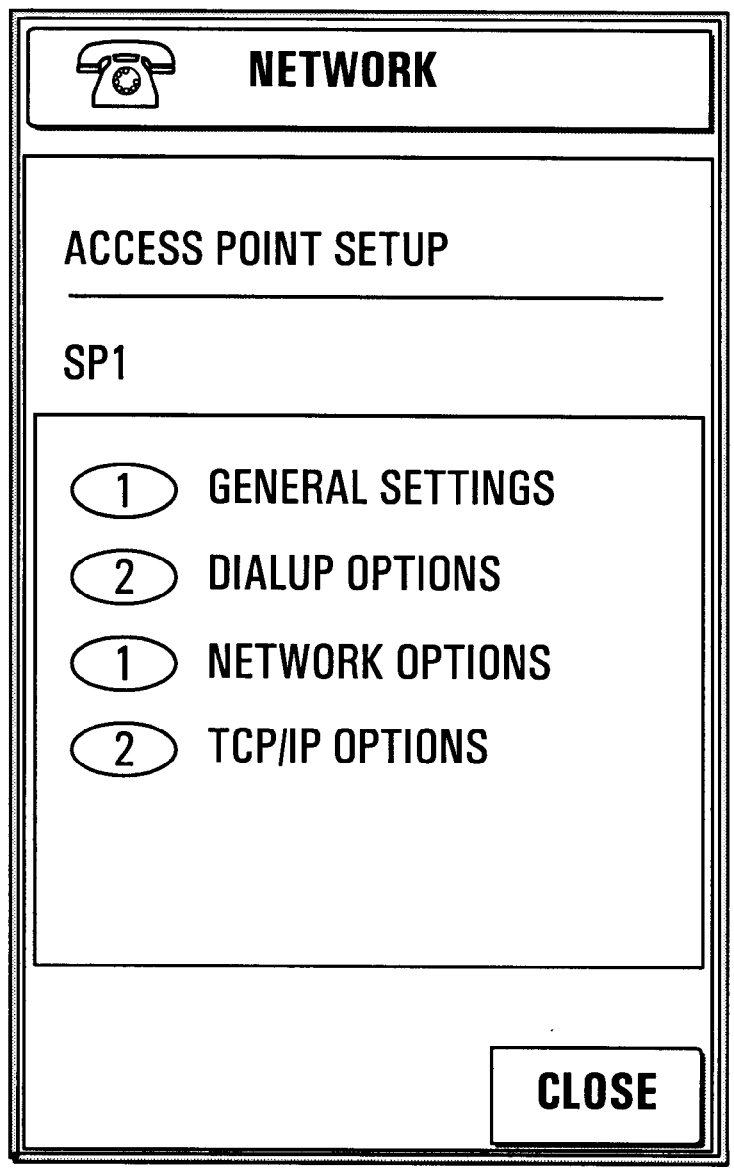
FIG. 8.2

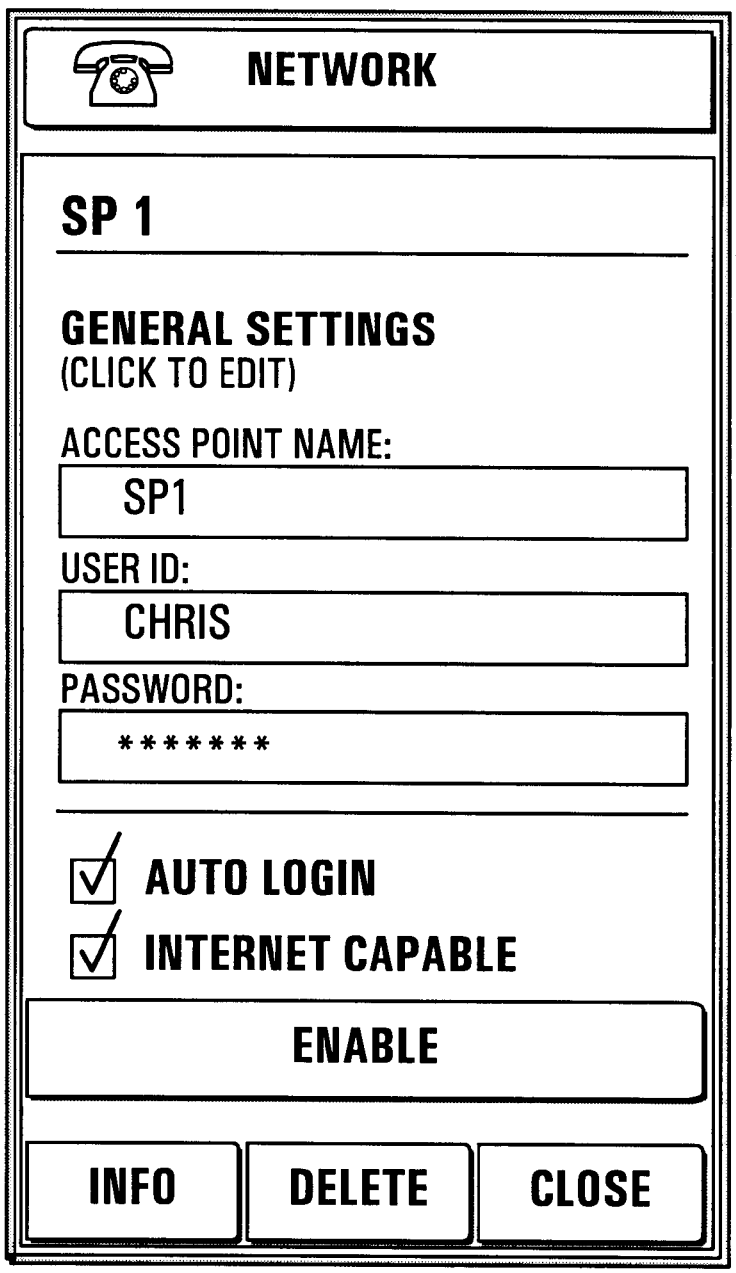
FIG. 8.3

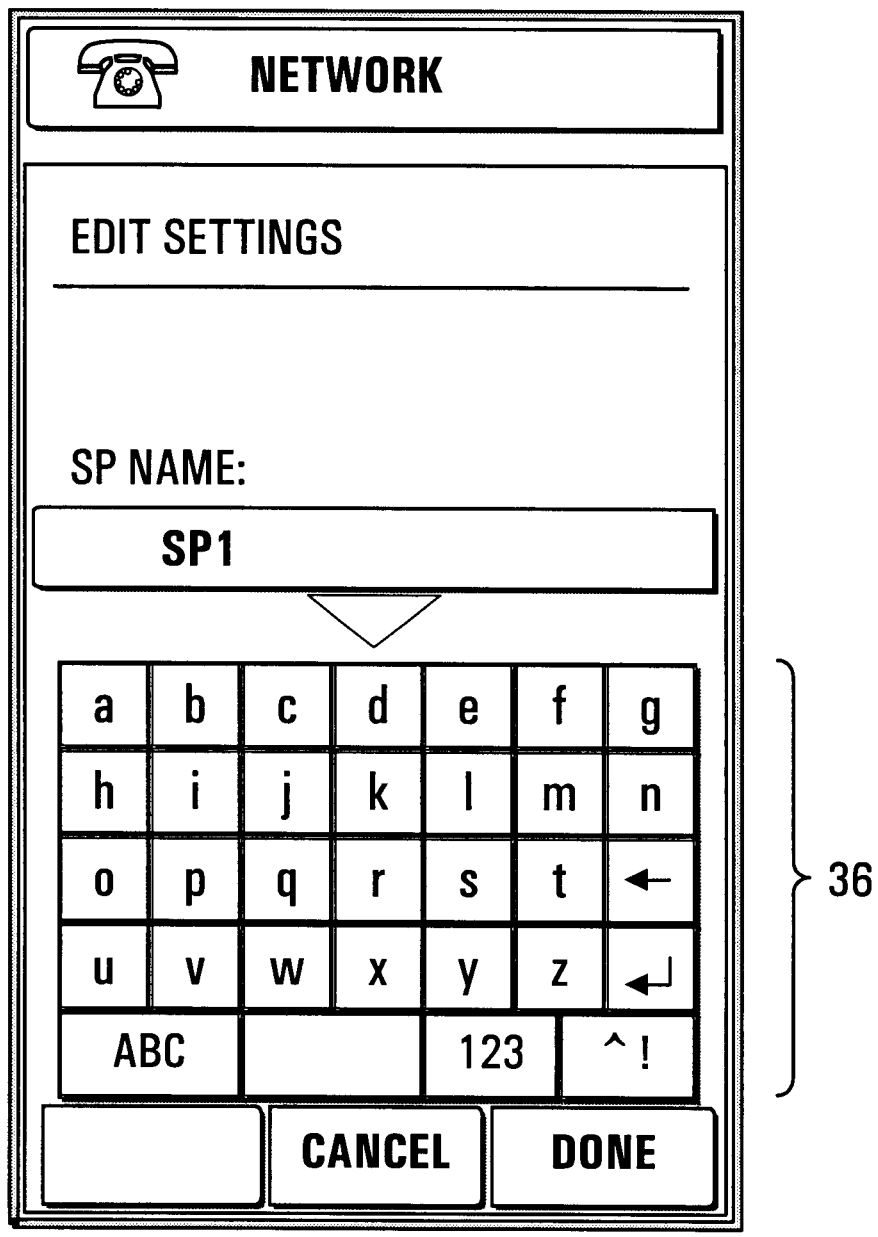
FIG. 8.4

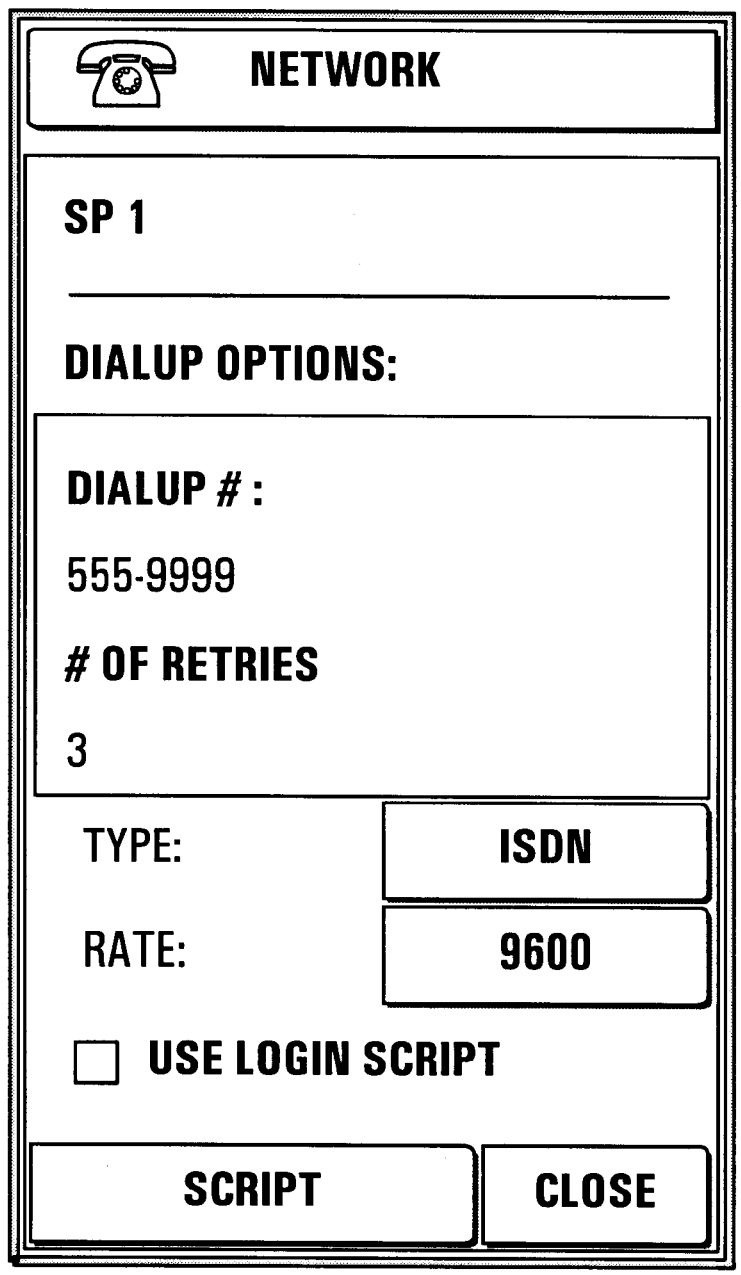
FIG. 8.5

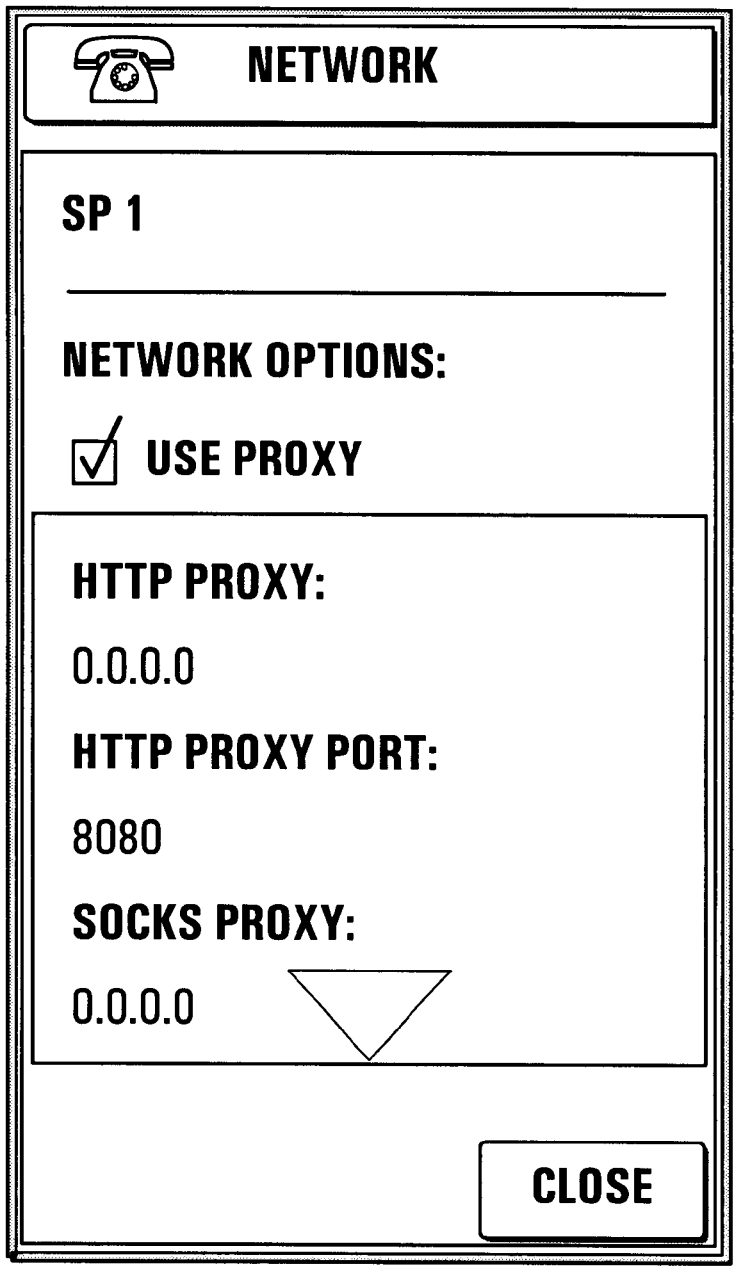
FIG. 8.6

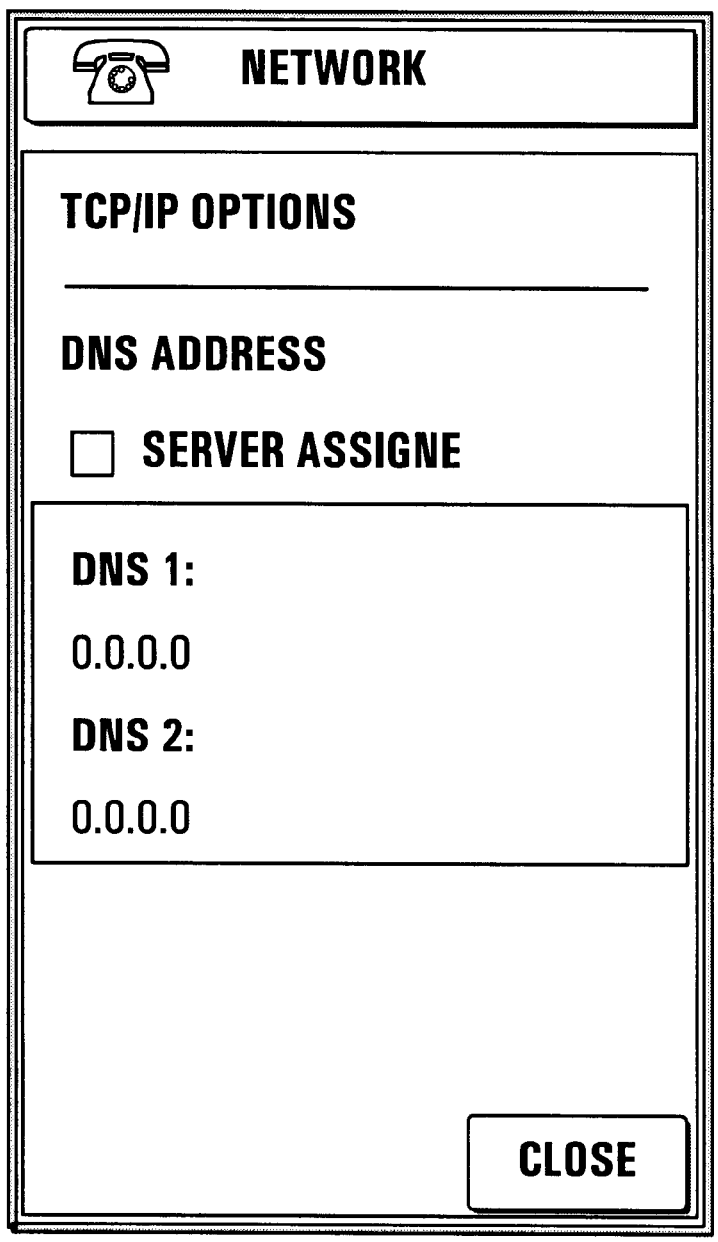
FIG. 8.7

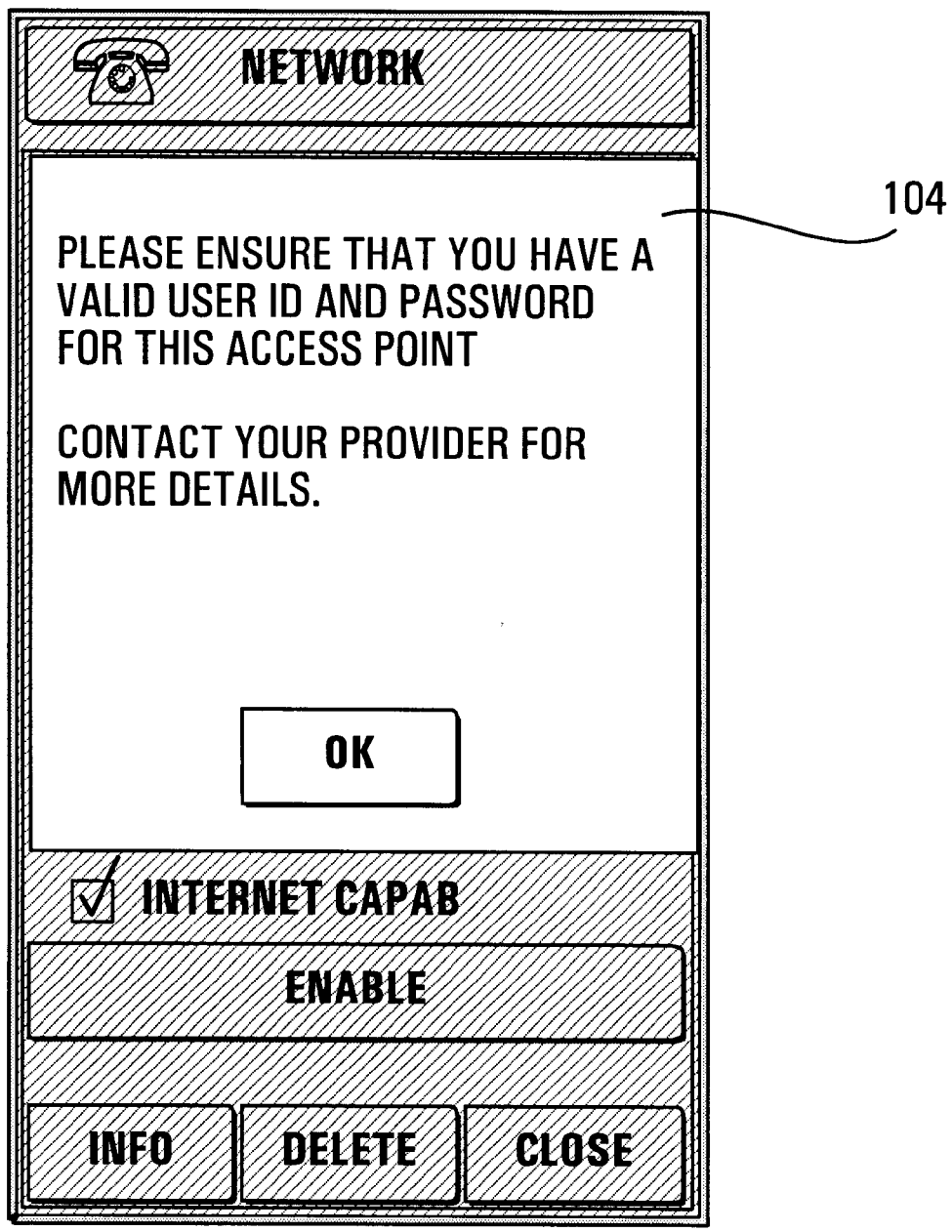
FIG. 8.8

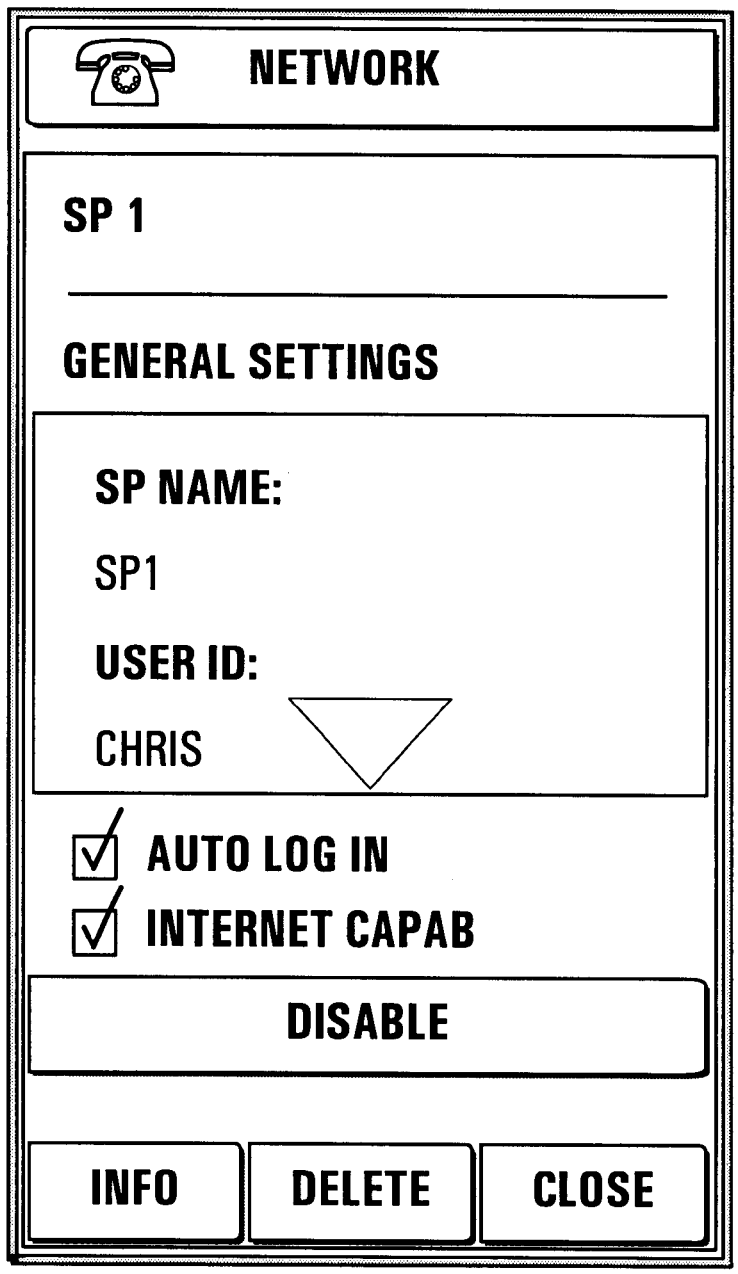
FIG. 8.9

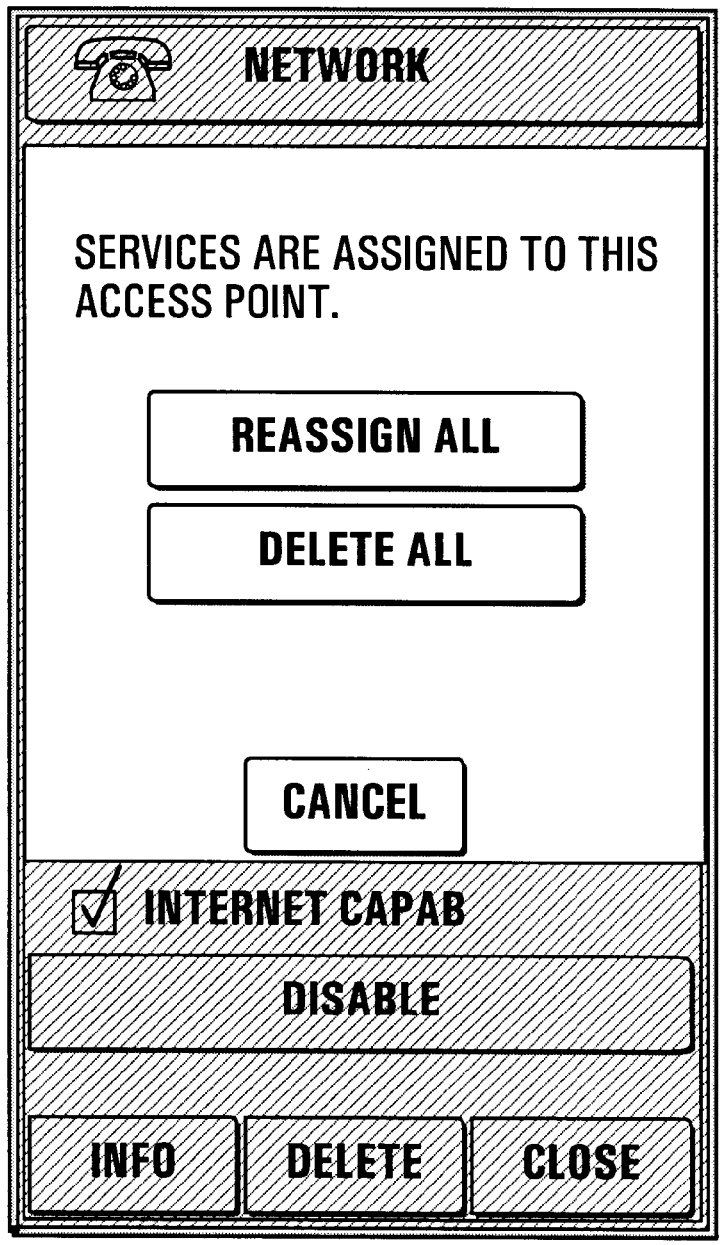
FIG. 8.10

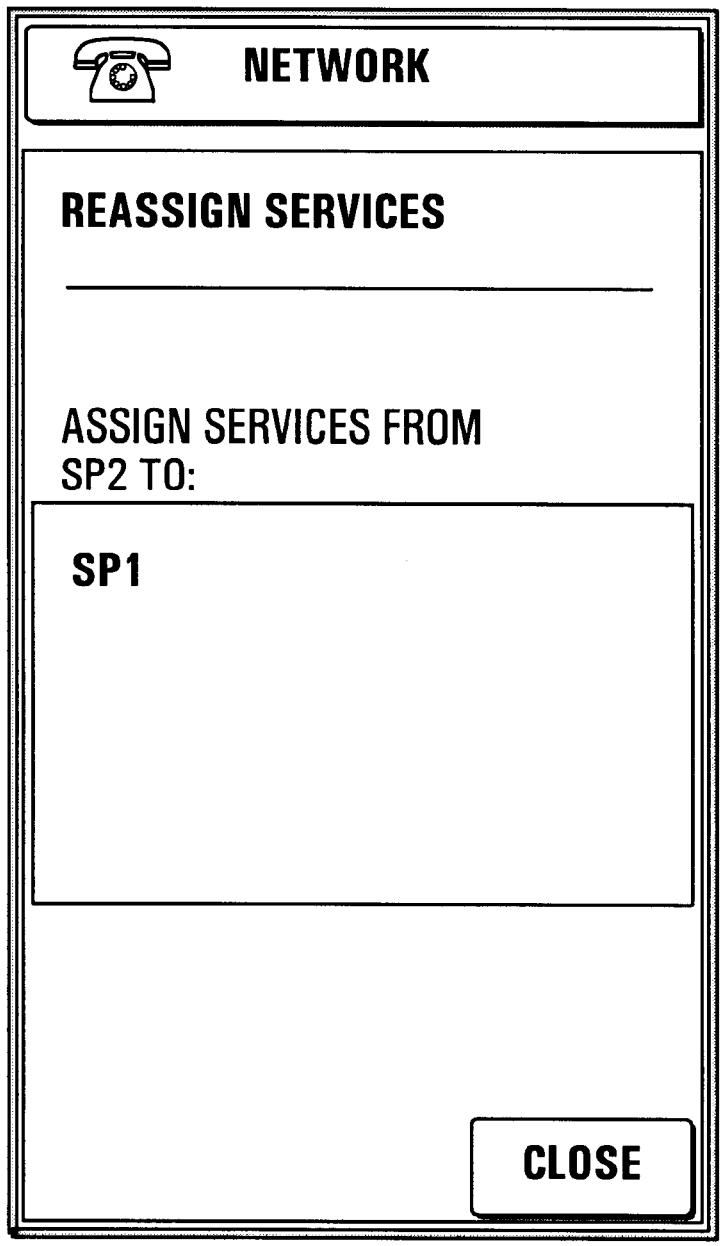
FIG. 8.11

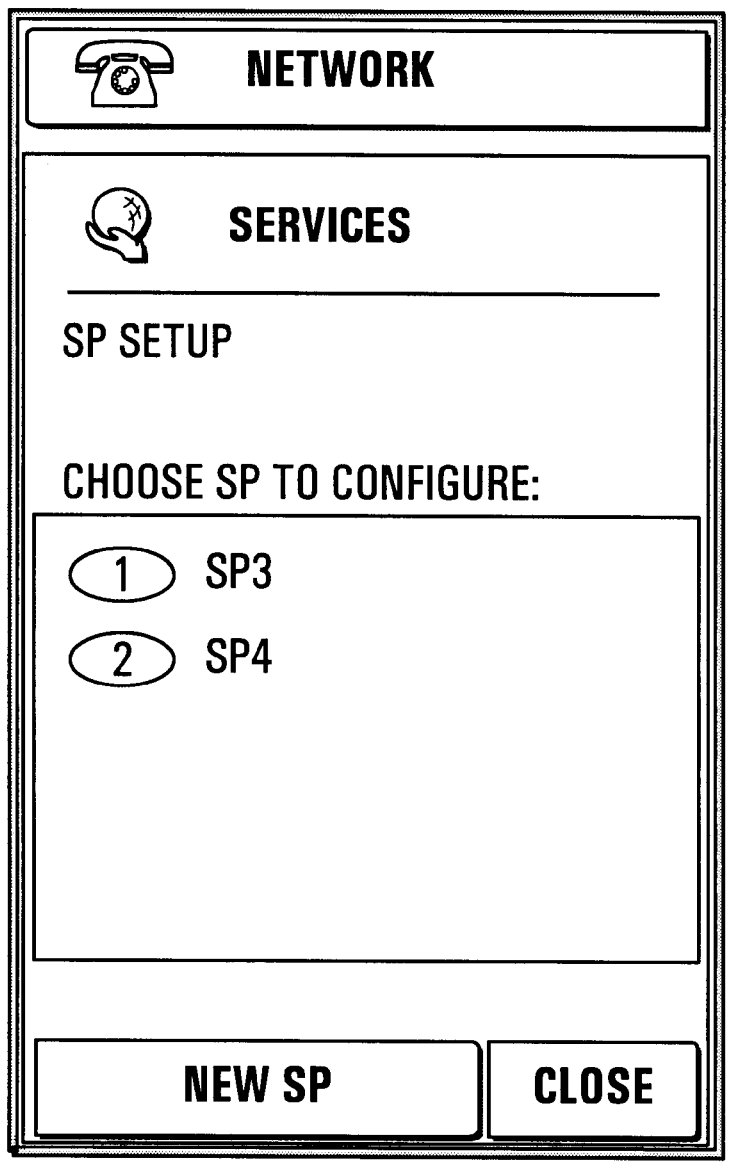
FIG. 8.12

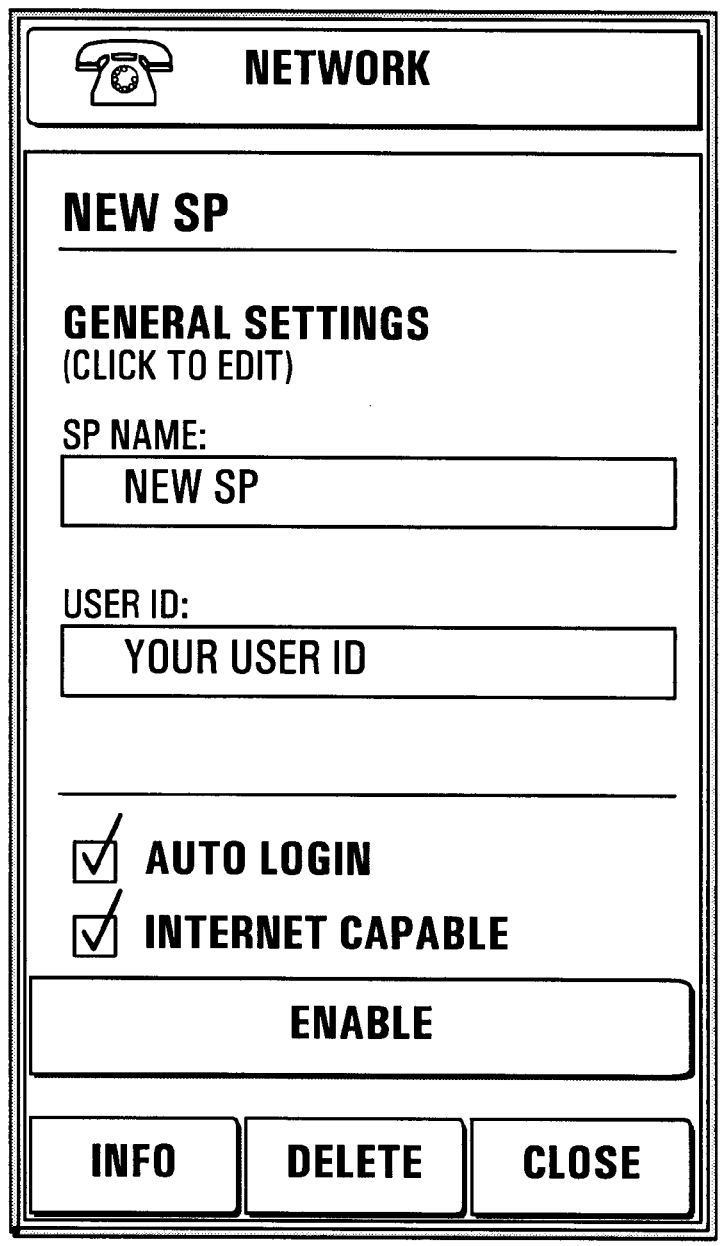
FIG. 8.13

TABLE 1: SERVICE OBJECT — 124

| NAME | |
|---|---|
| ACCESS POINT | |
| URL | |
| DATE OF LAST ACCESS | |
| DATE OF LAST UPDATE | |
| NOTES | |
| ... | |

FIG. 9.1

TABLE 2: ACCESS POINT OBJECT — 126

| NAME | |
|---|---|
| PHONE NUMBER | |
| USER ID | |
| PASSWORD | |
| SERVER TYPE | |
| SERVER ASSIGNED IP | |
| IP | |
| SERVER ASSIGNED DNS | |
| PRIMARY DNS | |
| SECONDARY DNS | |
| AUTO LOG IN | |
| INTERNET CAPABLE | |
| PROXY ADDRESS | |
| PROXY PORT | |
| ... | |

FIG. 9.2

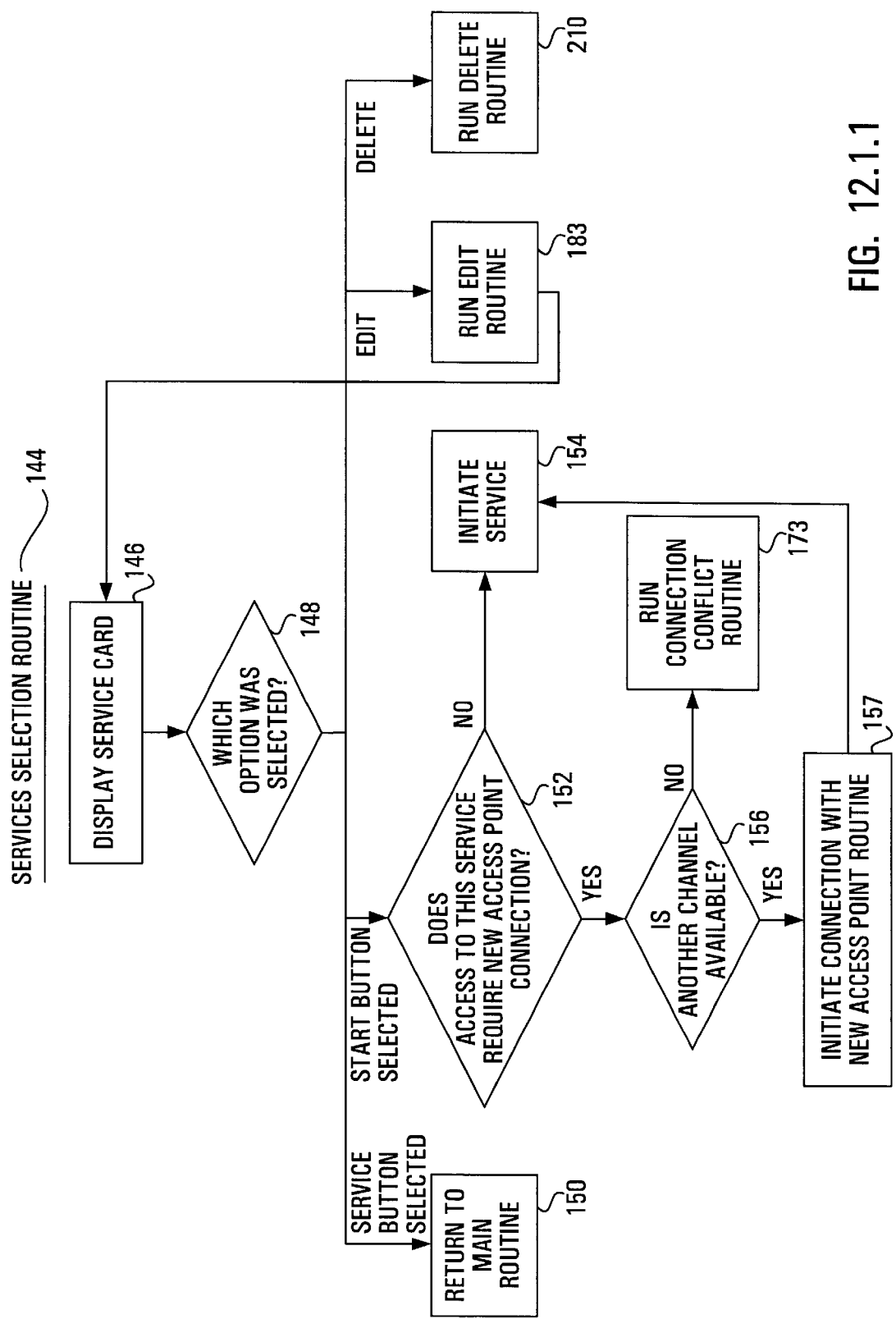
FIG. 12.1.1

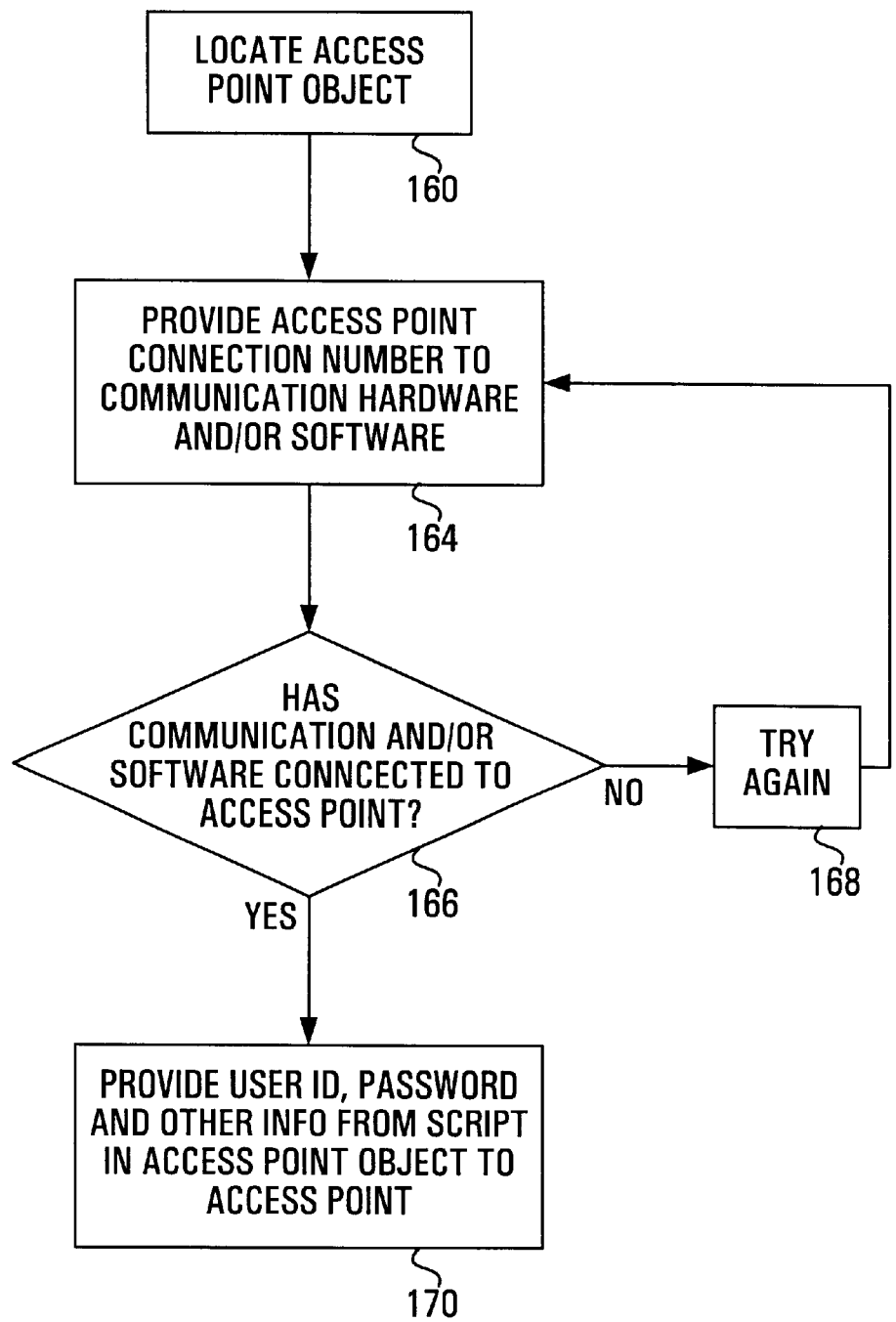
FIG. 12.1.2

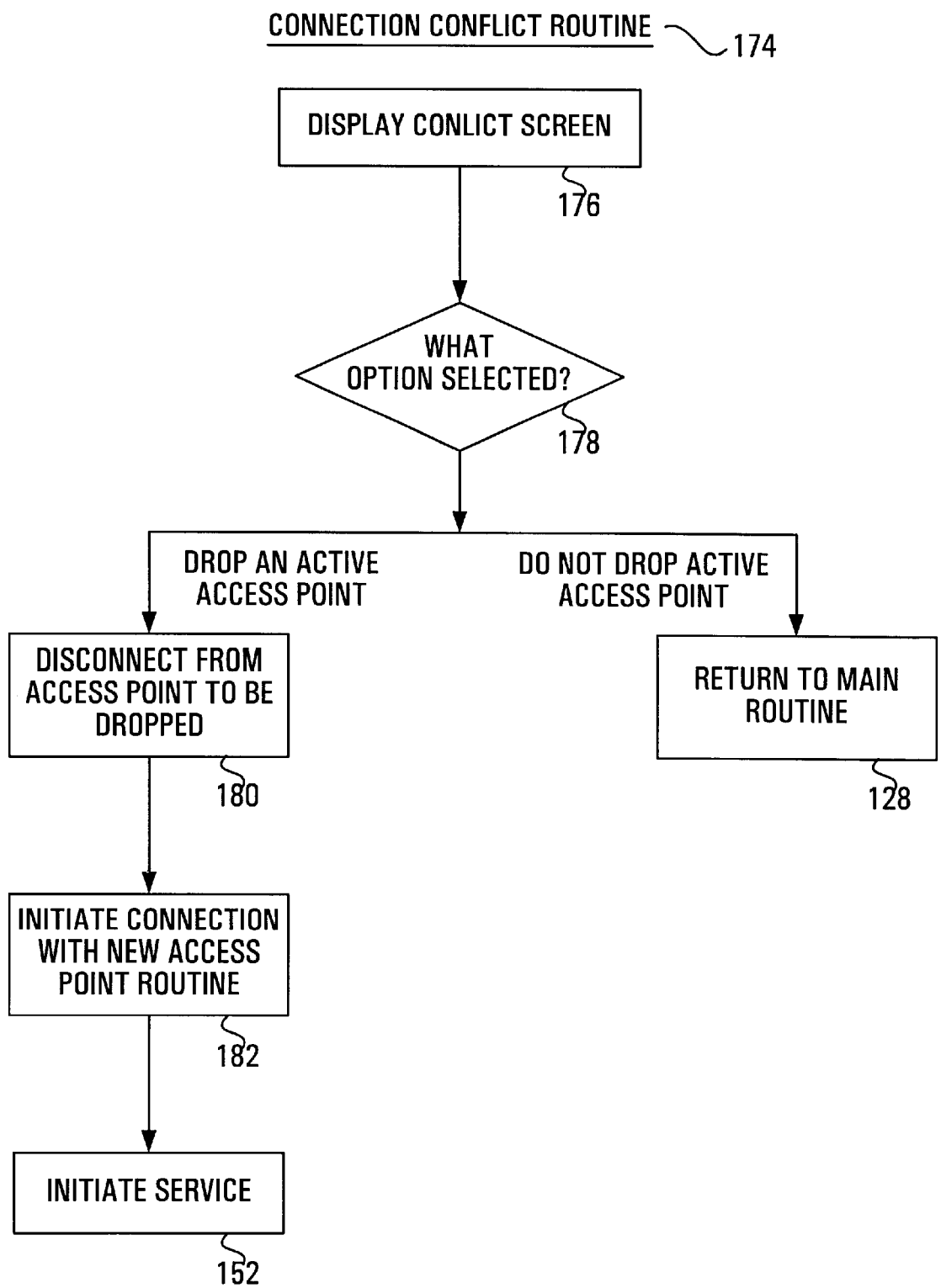
FIG. 12.1.3

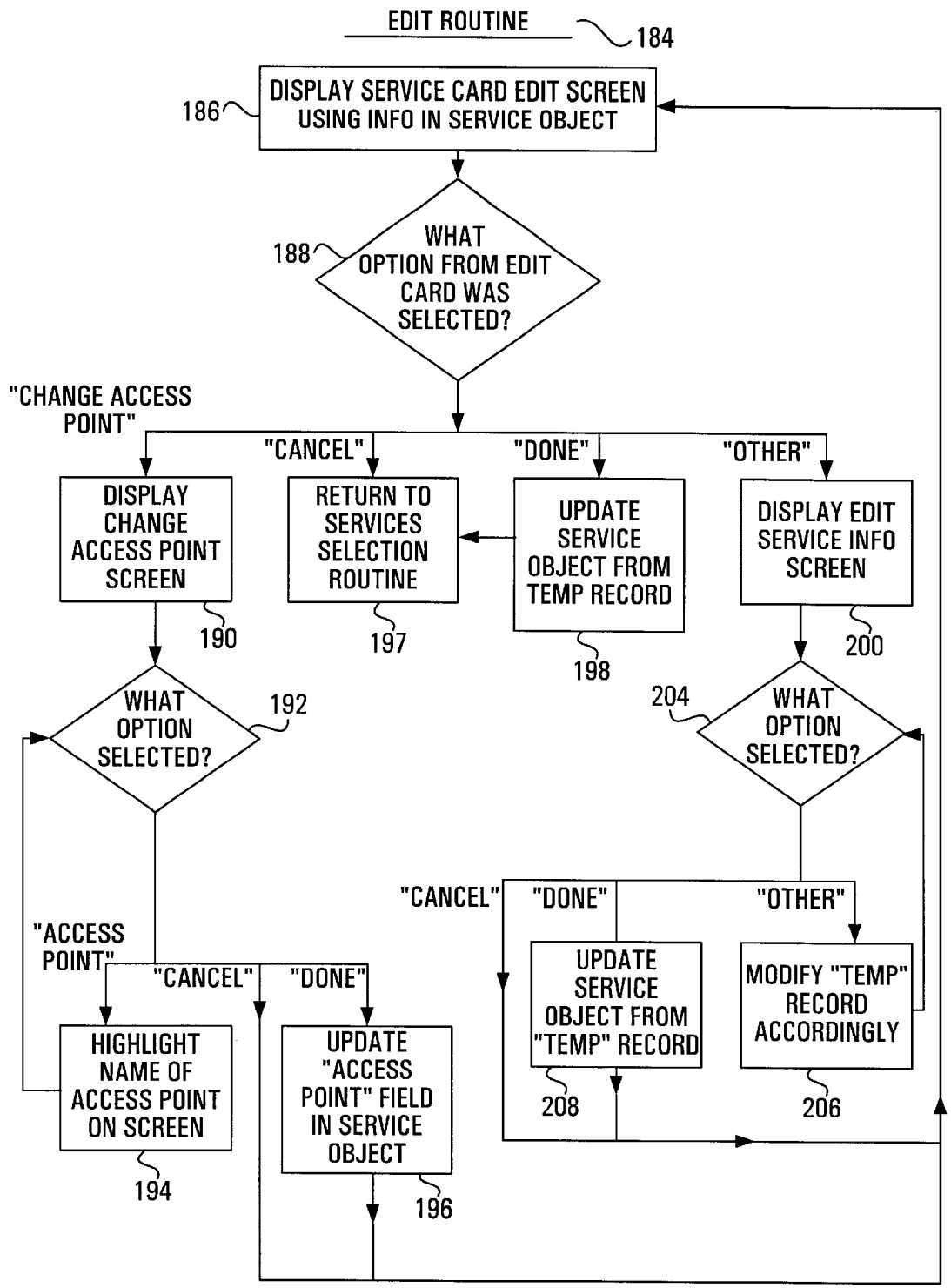
FIG. 12.2

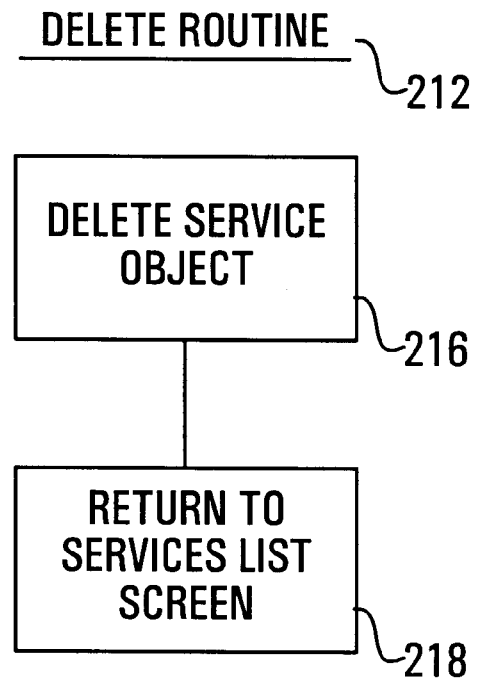
FIG. 12.3

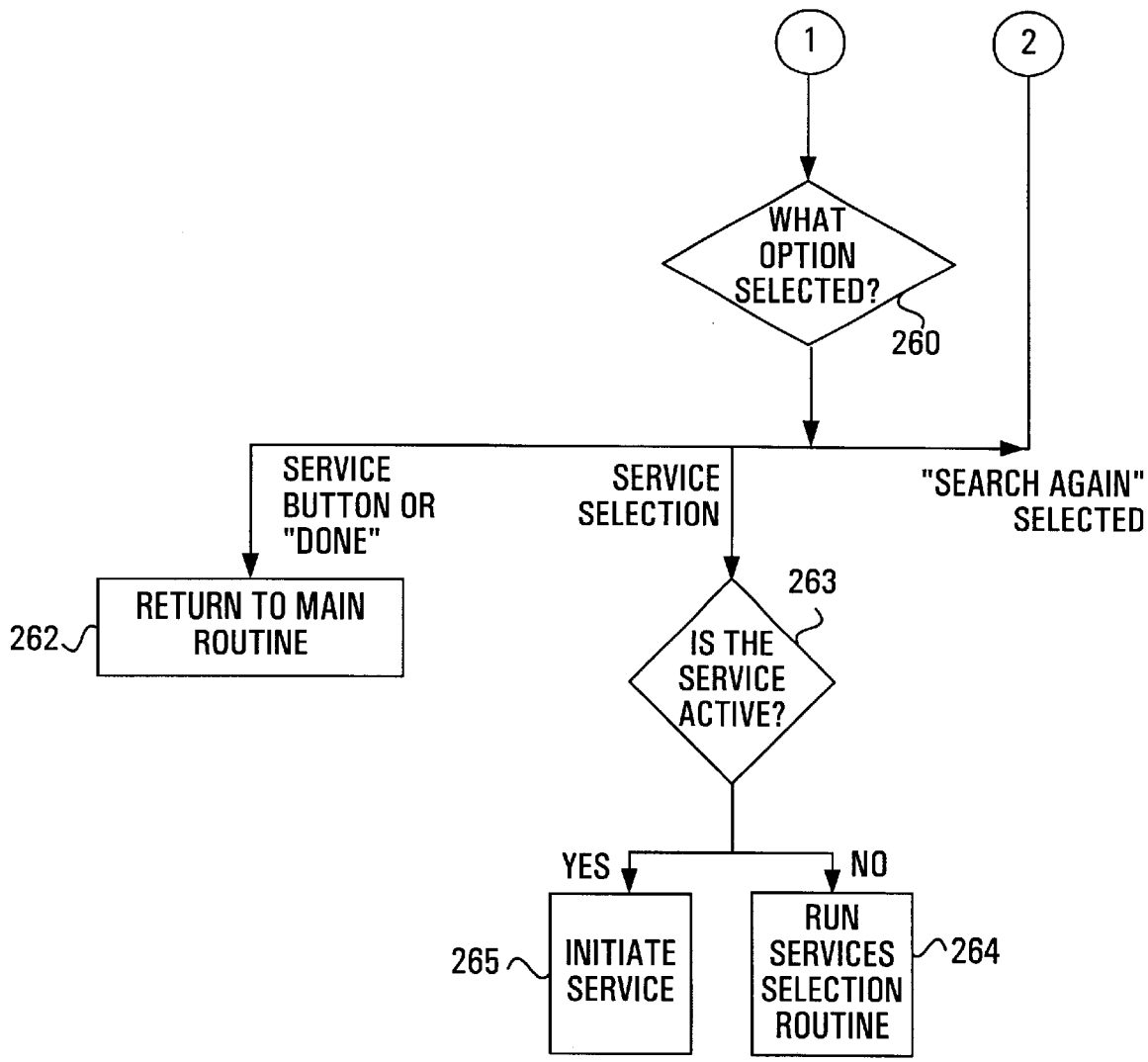
FIG. 13 CON'T

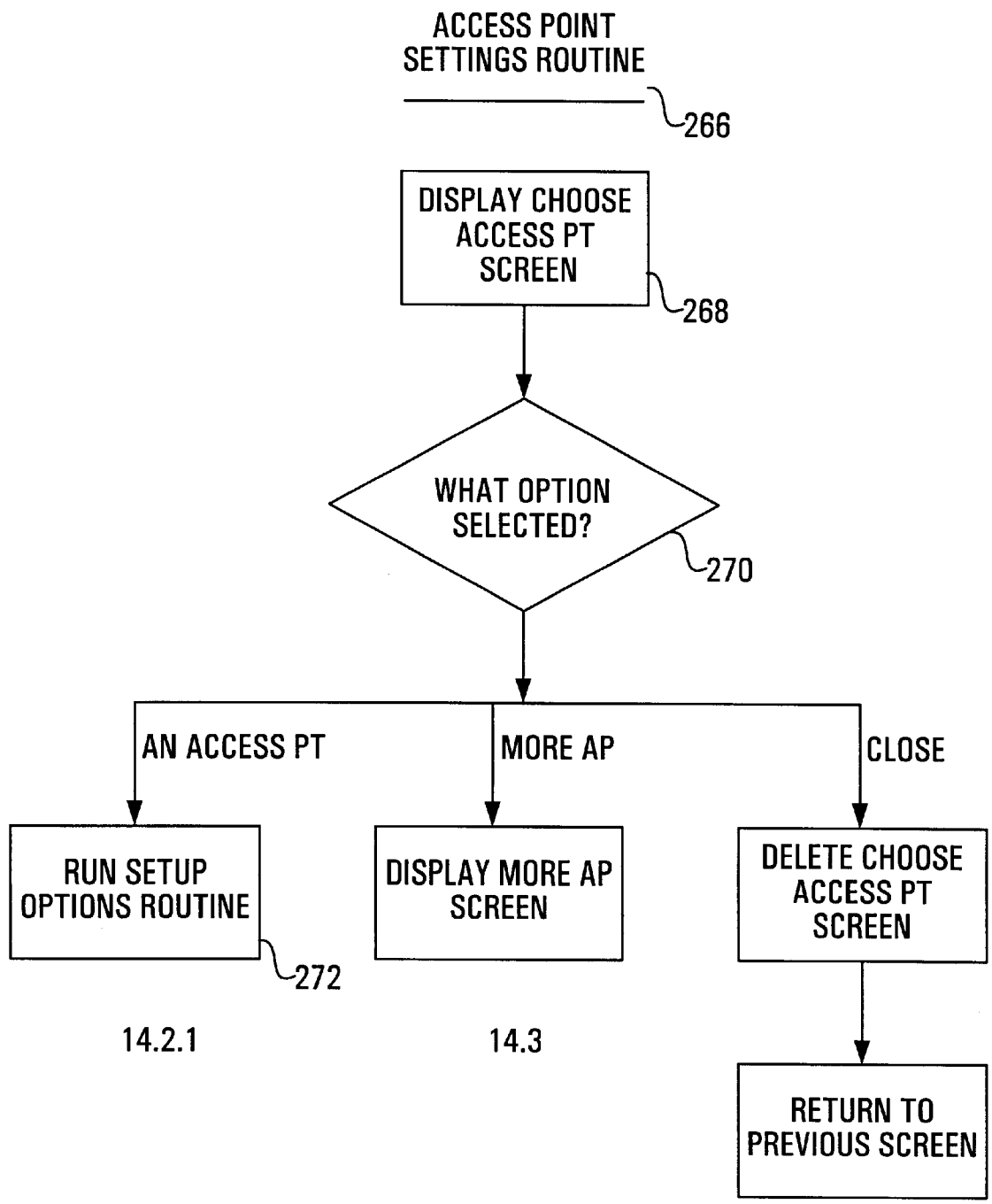
FIG. 14.1

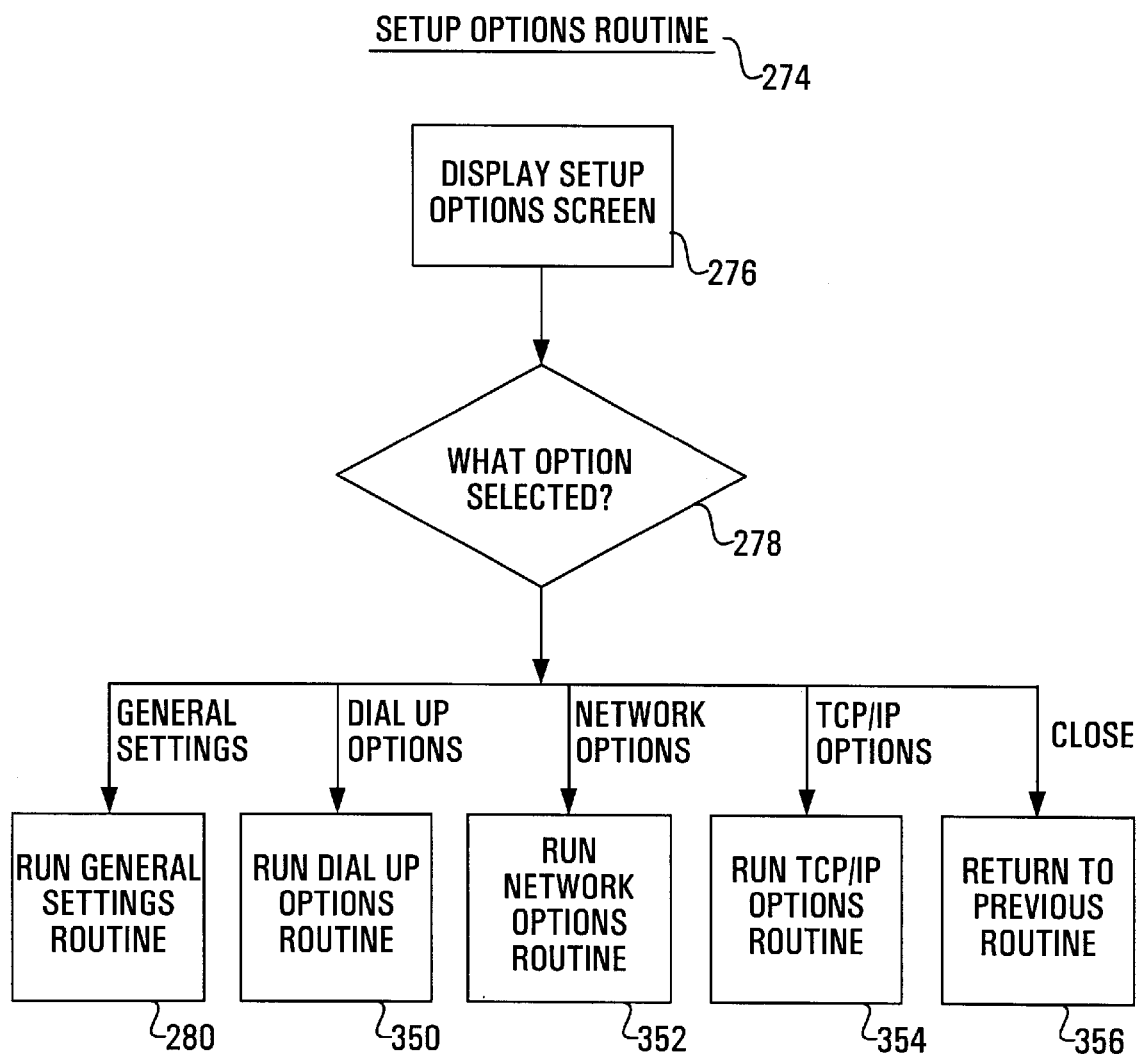
FIG. 14.2.1

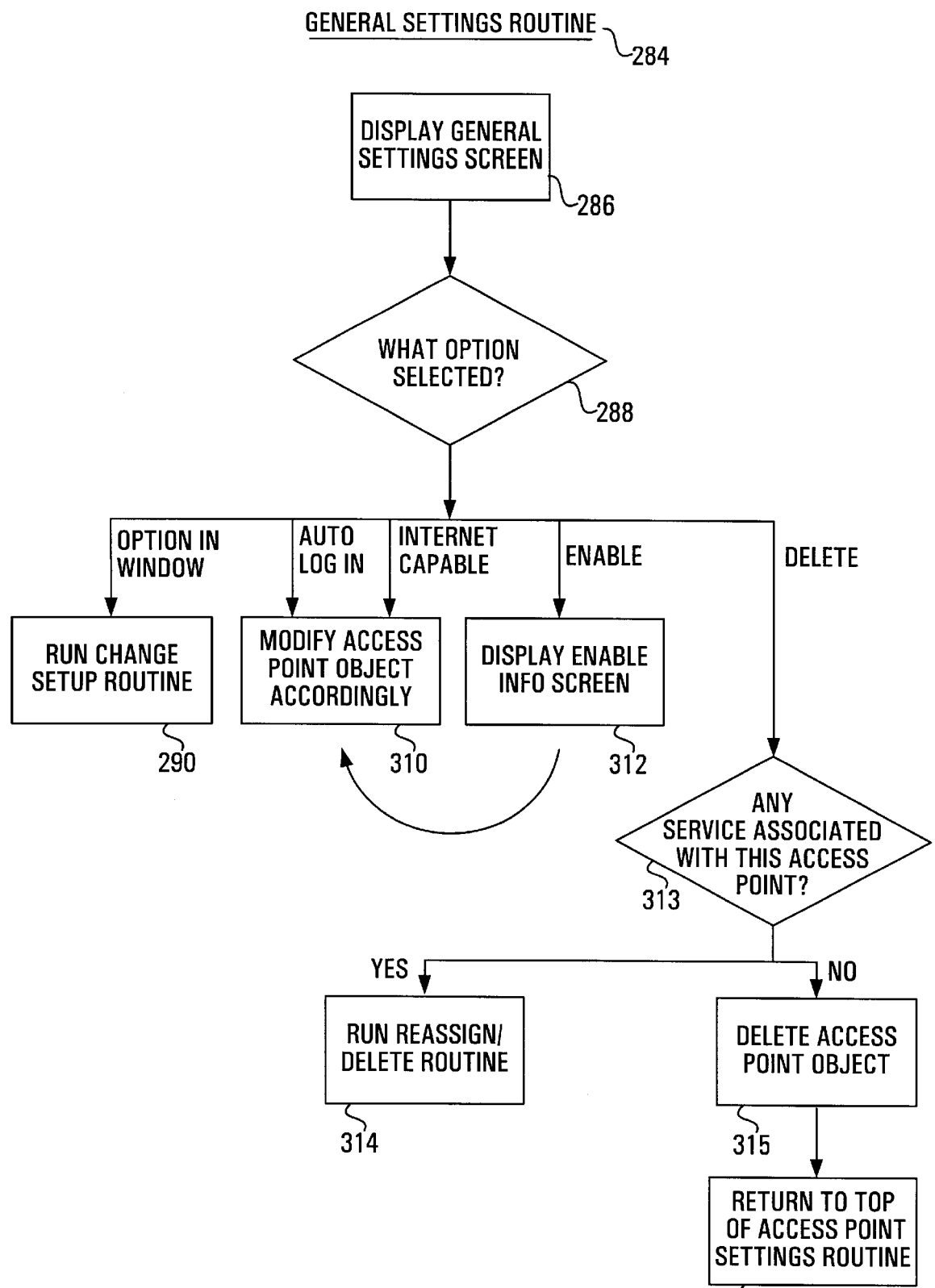
FIG. 14.2.2.1

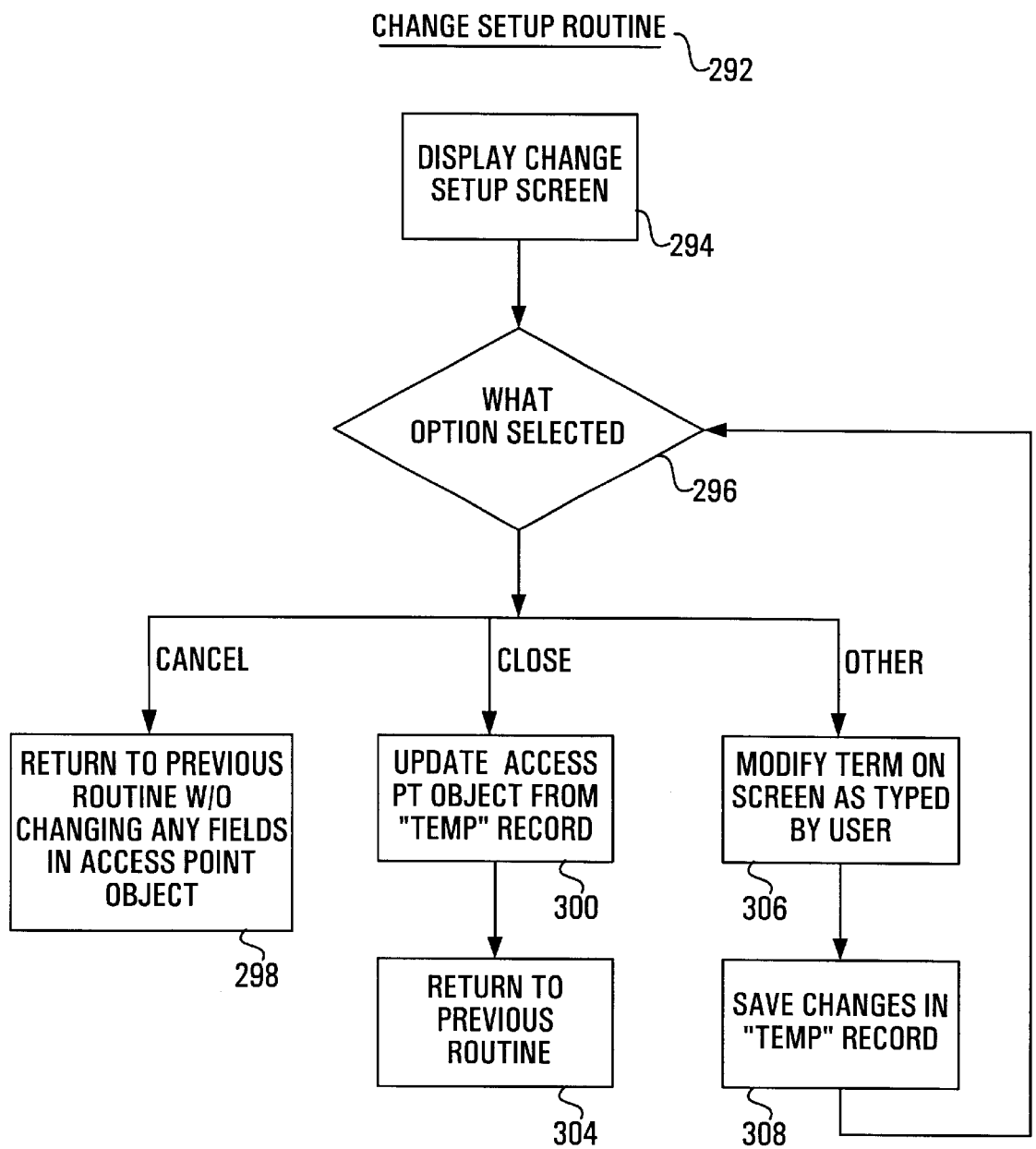
FIG. 14.2.2.2

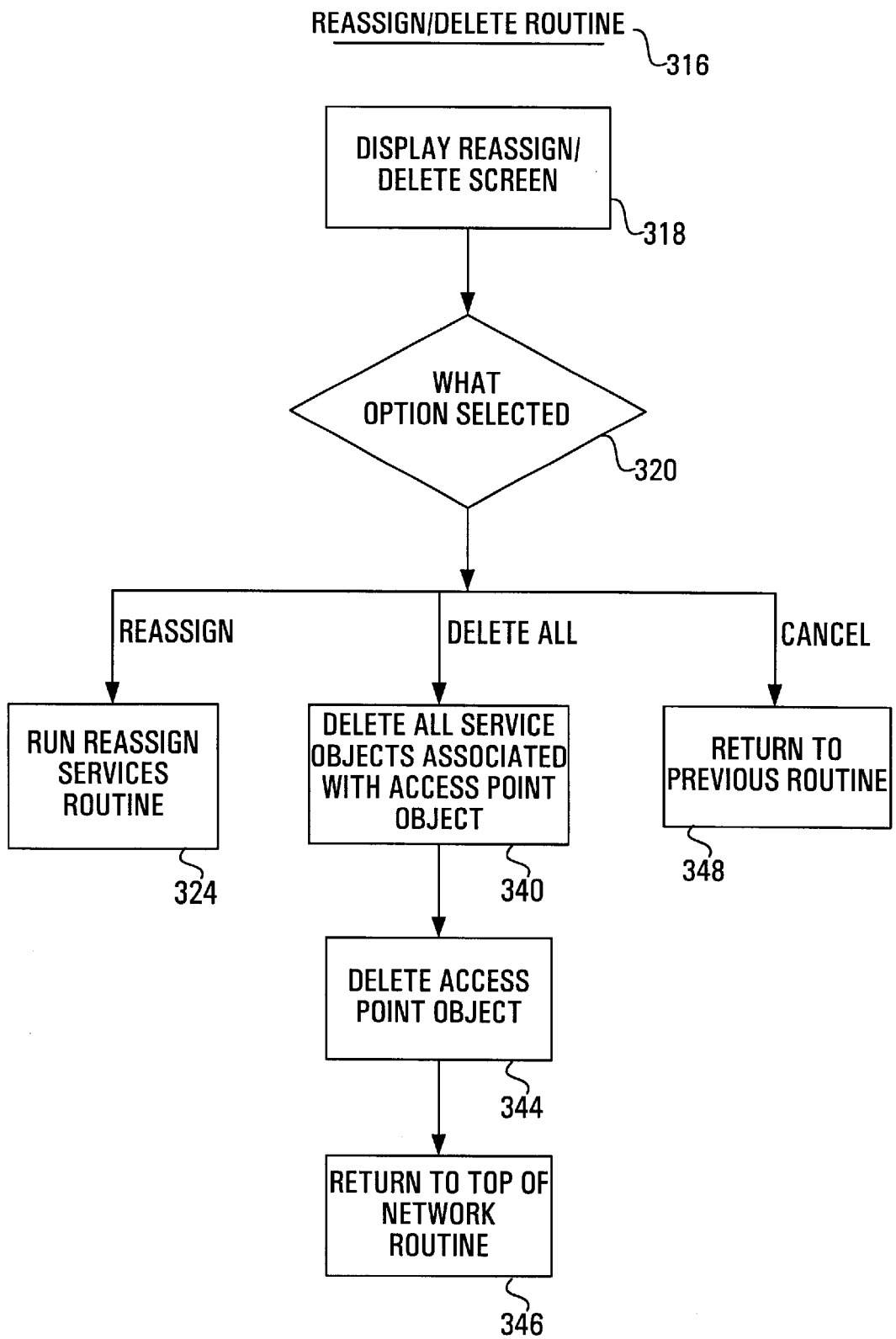
FIG. 14.2.3.1

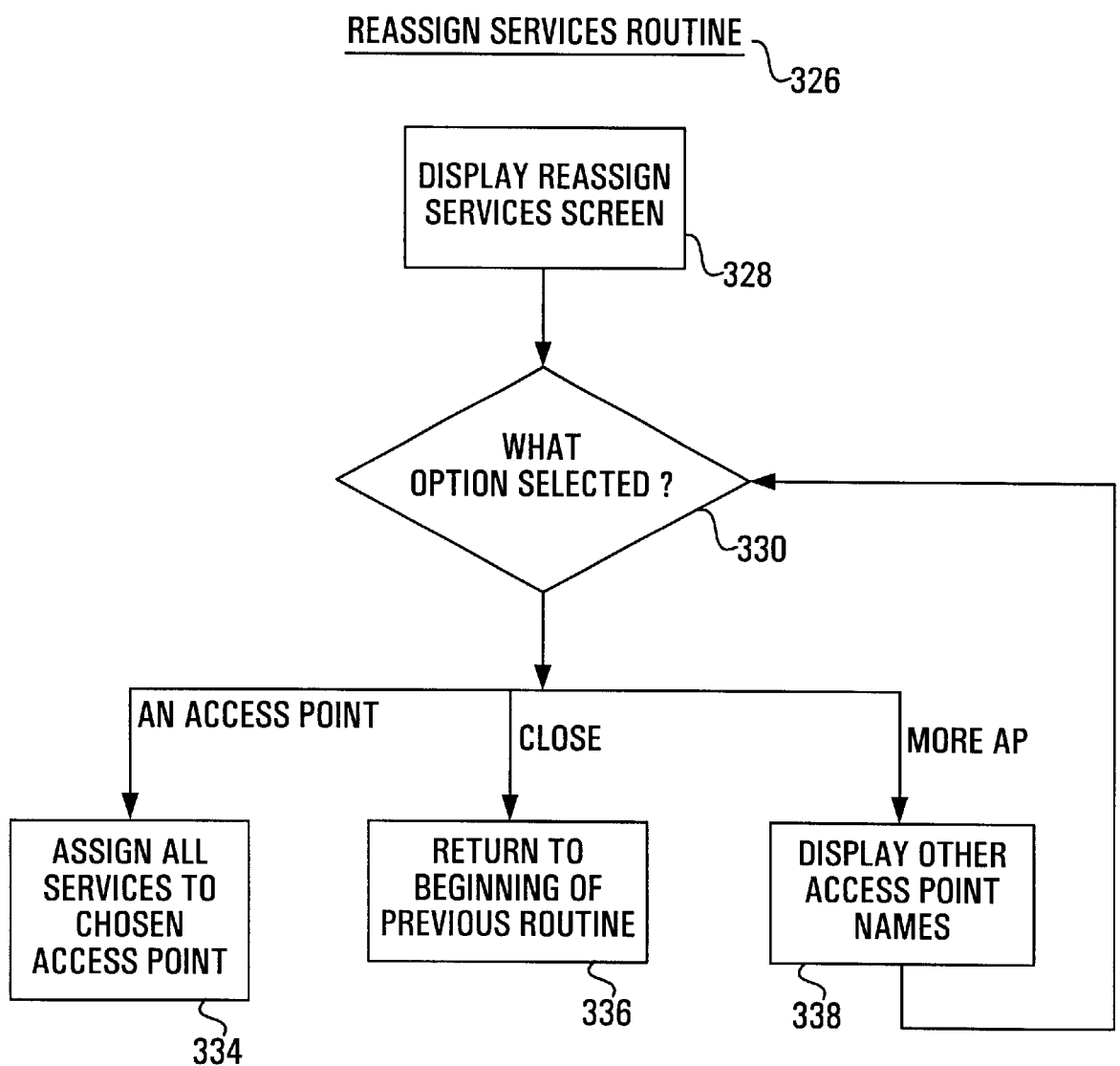
FIG. 14.2.3.2

METHOD AND SYSTEM IN A COMPUTER-BASED SYSTEM FOR PROVIDING ACCESS TO SERVICES ASSOCIATED WITH DIFFERENT ACCESS POINTS

FIELD OF THE INVENTION

The invention relates to computer-based systems such as personal computers, personal organizers and telephones, and is particularly concerned with a method and a computer system for providing access to services associated with different remote access points.

BACKGROUND OF THE INVENTION

Increasingly, users of computer-based systems wish to access information or services located elsewhere than on their own computer or computer-based device or their own network. For example, a user may wish to (a) consult an Internet web site using a first Internet Service Provider; (b) access a particular computer application located on another company's network through "direct dial" access (or "dial up" access); (c) send an e-mail message through the user's WAN (wide area network) to a co-worker; or (d) send an e-mail message to a friend over the Internet using a second Internet service provider.

In each of these examples (and many more could be given), the user accesses the information or service through an "access point" using a communication link (which could also be referred to as a communication line or a communication channel). A communication link (which is often simply a telephone line), is a physical or logical link used to carry a single stream or information, such as voice or data information. Typically, communication links are limited resources, in that there are only a certain number for a given system.

In many cases, a particular service must be accessed through a particular access point. An access point is a data communication channel or link used to connect with some set of network-based services. An access point is associated with specific parameters, such as, for example, a dial up parameter (eg: telephone number), access parameters (eg: identification/ password), and network configuration parameters (eg: proxy address, Internet Protocol (IP) address, etc). In general, an access point is provided by a service provider, such as, for example, an Internet Service Provider (ISP) or a corporate WAN/LAN connection server.

Typically, each service provider (hereinafter sometimes referred to as an "access point") will be represented by a separate icon on the user's computer-based system screen. To connect to a service provider, the user places the mouse pointer over the appropriate icon and double clicks the mouse button. The user is then typically prompted for information such as a user ID and password. Upon successful connection to the service provider, the user may then be faced with a number of different available services or options. The user must then double click (or otherwise select) the desired option.

Having accessed a particular service, the user may then wish to access a service provided by a different service provider. The user must then typically exit from the particular application or service being used and must then disconnect from the first service provider. The user must then select the icon for the second service provider, provide the requested user ID and password information and then select the desired service or application offered by the second service provider.

These repetitive steps can become frustrating and time-consuming for the user. This is especially so in view of the fact that, in the typical case, the user simply wishes to access a particular service or application and does not care where the service is located or which service provider provides the service.

A partial solution to these inconveniences is disclosed in U.S. Pat. No. 5,689,638 for "Method for Providing Access to Independent Network Resources by Establishing Connection Using an Application Programming Interface Function Call Without Prompting the User for Authentication Data" which issued to Sadovsky on Nov. 18, 1997. Sadovsky discloses a method for simplifying access to independent resources on (what appears to be) a local area network (LAN). Sadovsky contemplates the situation where each resource requires the user to provide a user ID and a password. Sadovsky simplifies the task of accessing a particular resource. When a user selects a particular resource, a computer program consults a look-up table to provide the user's ID and password automatically.

Although Sadovsky does simplify the user's access to a resource located on a single LAN, it would be desirable if it were simpler for a user to access different service providers, for example, located beyond the LAN such as through a diversity of dial-up access points. As well, if a user is connected to one resource and attempts to connect to another, Sadovsky teaches that the computer will simply indicate that it is not able to connect to that other resource. It would be desirable if the user were able to access two or more different resources without having to disconnect from a currently accessed resource. Even if it is not possible to access two or more resources at the same time, it would be desirable if the user could disconnect from one resource and access another service provider more transparently, efficiently and with less effort. It would also be desirable if the user could select a desired service or application with little or no concern about which service provider provides the service and without having to bother with preliminary screens or options provided by the service provider.

SUMMARY OF THE INVENTION

It is an object of the invention to obviate or mitigate one or more of the above identified disadvantages.

According to a first broad aspect, the invention provides in a programmable computer-based system ("CBS") comprising communication hardware and software and one or more communication links, a method of allowing a user of the CBS system to access services provided through access points, wherein the method comprises: displaying a user interface with a list of available services provided through the access points; if a user selects from the user interface a first service provided through a first access point, then, without further input from the user, connecting to the first access point and launching the service; if a user selects from the user interface one or more other services provided through the first access point while the CBS is connected to the first access point, then, without further input from the user, launching the one or more other services; if a user selects from the user interface a further service from a second access point while the CBS is connected to the first access point, then if a communication link is available for connection to the second access point, without further input from the user, connecting to the second access point and launching the further service from the second access point; otherwise, if a communication link is unavailable for connection to the second access point, querying the user as to whether the user wishes to connect to the second access point or remain connected to the first access point and if the user responds wishing to connect to the second access point, then, without further input from the user, disconnecting from the first access point, connecting to the second access point and launching the further service from the second access point.

According to another broad aspect, the invention provides a computer-readable medium containing a computer program that when loaded into a computer-based system ("CBS"), the CBS comprising communication hardware and software and one or more communication links, adapts the CBS to allow a user to access services provided through access points, wherein the program provides access to the services according to the following steps: providing the user with a user interface displaying a list of available services provided through the access points; if a user selects from the user interface a first service provided through a first access point, then, without further input from the user, connecting to the first access point and launching the service; if a user selects from the user interface one or more other services provided through the first access point while the CBS is connected to the first access point, then, without further input from the user, launching the one or more other services; if a user selects from the user interface a further service from a second access point while the CBS is connected to the first access point, then if a communication link is available for connection to the second access point, then, without further input from the user, connecting to the second access point and launching the further service from the second access point; otherwise, if a communication link is unavailable for connection to the second access point, querying the user as to whether the user wishes to connect to the second access point or remain connected to the first access point and if the user responds wishing to connect to the second access point, then, without further input from the user, disconnecting from the first access point, connecting to the second access point and launching the further service from the second access point.

According to yet another broad aspect, the invention provides a computer-readable medium containing a computer program that when loaded into a computer-based system ("CBS"), the CBS comprising communication hardware and software and one or more communication links, adapts the CBS to allow a user to access services provided through access points, wherein the program provides access to the services according to the following steps: providing the user with a user interface displaying a list of available services provided through the access points; if a user selects from the user interface a first service provided through a first access point, then, without further input from the user, connecting to the first access point and launching the service; if a user selects from the user interface a second service provided through the first access point while the CBS is connected to the first access point, then, without further input from the user, launching the second service; if a user selects from the user interface a further service from a second access point while the CBS is connected to the first access point, then if a communication link is available for connection to the second access point, then, without further input from the user, connecting to the second access point and launching the further service from the second access point; otherwise, if a communication link is unavailable for connection to the second access point, then, without further input from the user, disconnecting from the first access point, connecting to the second access point and launching the further service from the second access point.

According to a further broad aspect, the invention provides a programmable computer-based system ("CBS") adapted to allow a user to access services provided through access points, the CBS comprising input means, output means, a central processing unit, software, memory means, communication hardware, communication software, communication link means, for each access point, an Access Point Object, wherein the Access Point Object comprises a data structure for storing information including information for connecting with the access point and information for accessing services associated with the access point; and for each service, a Service Object, wherein the Service Object comprises a data structure for storing information including an access point associated with the service, and parameters for launching the service; wherein the CBS is adapted to display on the output means a user interface with a list of available services provided through the access points, and wherein, if a user, using the input means, selects from the user interface a first service provided through a first access point, then, without further input from the user, the CBS connects to the first access point by providing the communication hardware and software with the information for connecting with the access point from the Access Point Object associated with the access point; and launching the service by utilizing the parameters for launching the service associated with the service's Service Object; and wherein if a user, using the input means, selects from the user interface one or more other services provided through the first access point while the CBS is connected to the first access point, then, without further input from the user, the CBS launches the one or more other services by utilizing the parameters for launching the services associated with the Service Objects of the one or more other services; and wherein if a user, using the input means, selects from the user interface a further service from a second access point while the CBS is connected to the first access point, then if a communication link means is available for connection to the second access point, without further input from the user, the CBS connects to the second access point by providing the communication hardware and software with the information for connecting with the second access point from the Access Point Object associated with the second access point; and launching the further service by utilizing the parameters for launching the service associated with the second service's Service Object; otherwise, if a communication link means is unavailable for connection to the second access point, the CBS queries the user on the output means as to whether the user wishes to connect to the second access point or remain connected to the first access point and if the user, using the input means responds wishing to connect to the second access point, then, without further input from the user, the CBS disconnects from the first access point, and connects to the second access point by providing the communication hardware and software with the information for connecting with the second access point from the Access Point Object associated with the second access point; and launching the further service by utilizing the parameters for launching the service associated with the second service's Service Object.

Advantages of the present invention include allowing the user to connect with different access points or service providers relatively efficiently and transparently and allowing the user to select applications or services provided through different access points transparently and with relative ease, without concern for which service provider provides a given service.

BRIEF DESCRIPTION OF THE DRAWINGS

Preferred embodiments of the invention will now be described with reference to the attached drawings in which

FIG. 3.1 is a Service List screen;

FIG. 3.2.1 is a representative Service Card screen for Service A of FIG. 3.1;

FIG. 3.2.2 is a representative Service screen for Service A of FIG. 3.1;

FIGS. 3.3.1, 3.3.2 and 3.3.3 are an Edit Service Card screen, a Change Access Point Screen and an Edit Service Info screen for editing information of a Service Card of FIG. 3.2.1 or changing an access point associated with a service;

FIGS. 4.1, 4.2 and 4.3 are a Search screen, a Multiple Matches screen and a Feedback screen, respectively, for the search function accessible through the Services List screen of FIG. 3.1;

FIG. 7.1 is the Service List screen of FIG. 3.1 showing Service A active in the background;

FIGS. 7.2.1 –7.2.3 are Network Conflict screens where the computer-based system has insufficient communication links to connect to a further access point;

FIGS. 8.1 –8.13 are screens relating to configuration of an access point;

FIGS. 9.1 and 9.2 are example data structures for a Service Object and an Access Point Object, respectively;

FIGS. 12.1.1, 12.1.2, 12.1.3, 12.2 and 12.3 are flow charts relating to the flow of events when a user selects a service from the Service List screen of FIG. 3.1;

FIGS. 14.1, 14.2.1, 14.2.2.1, 14.2.2.2, 14.2.3.1 and 14.2.3.2 are flow charts relating to adding new services and access points and reconfiguring access points.

DETAILED DESCRIPTION OF THE PREFERRED EMBODIMENTS

Figure 1:
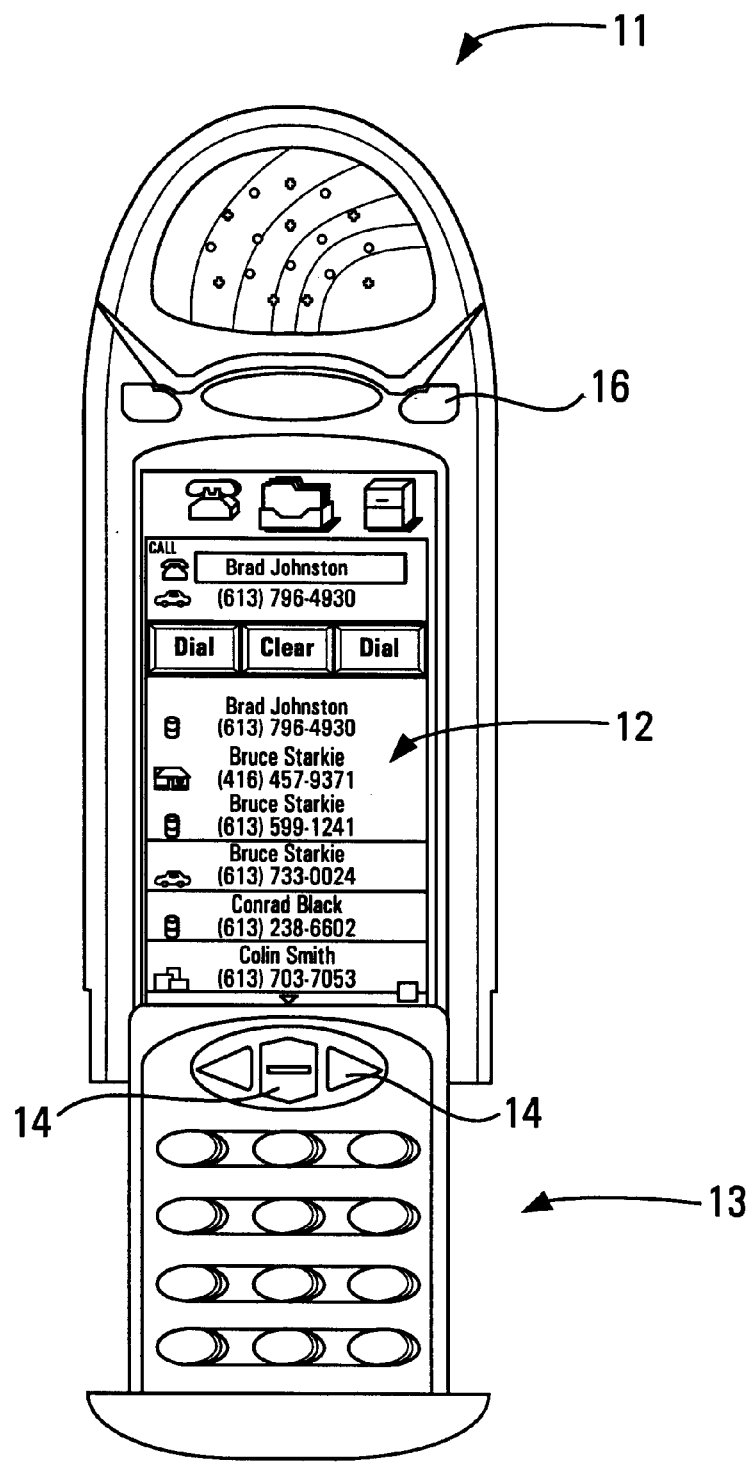
FIG. 1 is a representative telephone handset having a screen.

The invention is intended to be implemented on a computer-based system (hereinafter sometimes referred to as a "CBS"). A typical CBS includes one or more input devices (such as, for example, a keyboard, a modem, a mouse, a pen), one or more output devices (such as, for example, a display device, a modem, a printer, a sound device), a central processing unit (CPU) being part of a computer processor sub-system, main memory (which includes read only memory (ROM) and random access memory (RAM)), and secondary storage (which could include, for example, floppy disks, hard disks, CD-ROM, and other devices that use, for example, optical or magnetic media). Information is typically conveyed to and from the various parts of the CBS through a bus structure. Examples of CBSs include, for example, personal computers, laptop computers, telephone devices, personal organizers, computerized information kiosks, etc.

Frequently, CBS users wish to communicate with other CBSs, which are sometimes referred to as servers, depending upon their function. CBSs can communicate with each other through networks (which typically use at least some dedicated lines or cables), through standard telephone lines or through wireless communication, etc. For communication between CBSs, in most cases, information from one CBS is passed through a sending CBS's communication software and/or hardware (which might, for example, include a modem), and then through a receiving CBS's communication software and/or hardware.

Before one CBS communicates with another CBS, it is usually necessary for the CBSs to agree upon certain parameters or protocols, such as the rate of transfer of information (baud rate). Further, for security reasons, a CBS will often require a user from another CBS to supply a user ID and password to gain access to some or all of the CBS's services or resources.

To gain access to the Internet, a user will access an Internet Service Provider (ISP). Apart from providing access to the Internet, the ISP may provide other services such as, for example, electronic mail services, local weather forecasts, file storage space, etc.

A user may also, for example, wish to access a company's local area network (LAN), which may allow access to the company's internal e-mail service, internal library catalogue and the company's own Internet access and internal Web pages.

The invention will now be described with reference, for example purposes, to one hypothetical service provider, hereinafter referred to as "SP1" and a second hypothetical service provider, hereinafter referred to as "SP2". For convenience, each of the SP1 and SP2 will sometimes be referred to as access points. (As noted above, an access point allows access to one or more services through a given physical connection such as a modem link, a wireless link or a LAN interface.)

OVERVIEW

The invention, which in one embodiment, may be described as a CBS application, allows a user to access services provided by different service providers easily and transparently. As will be described in greater detail below, a user interface is displayed showing different services associated with one or more service providers. The user interface could be graphic, text only, voice driven, etc. A user accesses a first service from a first service provider by selecting the first service from the user interface (eg: by clicking a mouse button when a mouse pointer is placed over the chosen service or by touching an area of the screen). The CBS application, without any further input from the user, connects the user's CBS to a first service provider and then initiates the chosen service. At this point, the user can also simultaneously launch any other service listed on the user interface associated with the first service provider.

If the user's CBS is connected to the first service provider and the user selects a further service from the user interface which is associated with a second service provider, then one of two possibilities can occur. If a communication link is available (ie: one communication link is being used to connect with the first service provider and a second communication link is available for connection with the second service provider) then, without further input from the user, the CBS application will connect the user's CBS to the second service provider and will launch the further service. However, if a communication link is not available, then the CBS application will give the user the choice of (a) cancelling the request to launch the further service or (b) disconnecting from the first service provider in order to connect to the second service provider.

As noted above, the CBS can include a large number of different types of devices. As an example of one type of CBS, a telephone handset 11 is shown in FIG. 1, having, amongst other features, at display screen 12, a slidable keypad 13, navigation keys 14, and a settings key 16.

FIGS. 2–8 are hypothetical examples of the output or user interface from the method and system described below. Each of the individual sub-figures of FIGS. 2–8 represents an example "window" of a CBS user interface screen or possibly the entire CBS screen, depending upon the user's preference.

Figure 2:
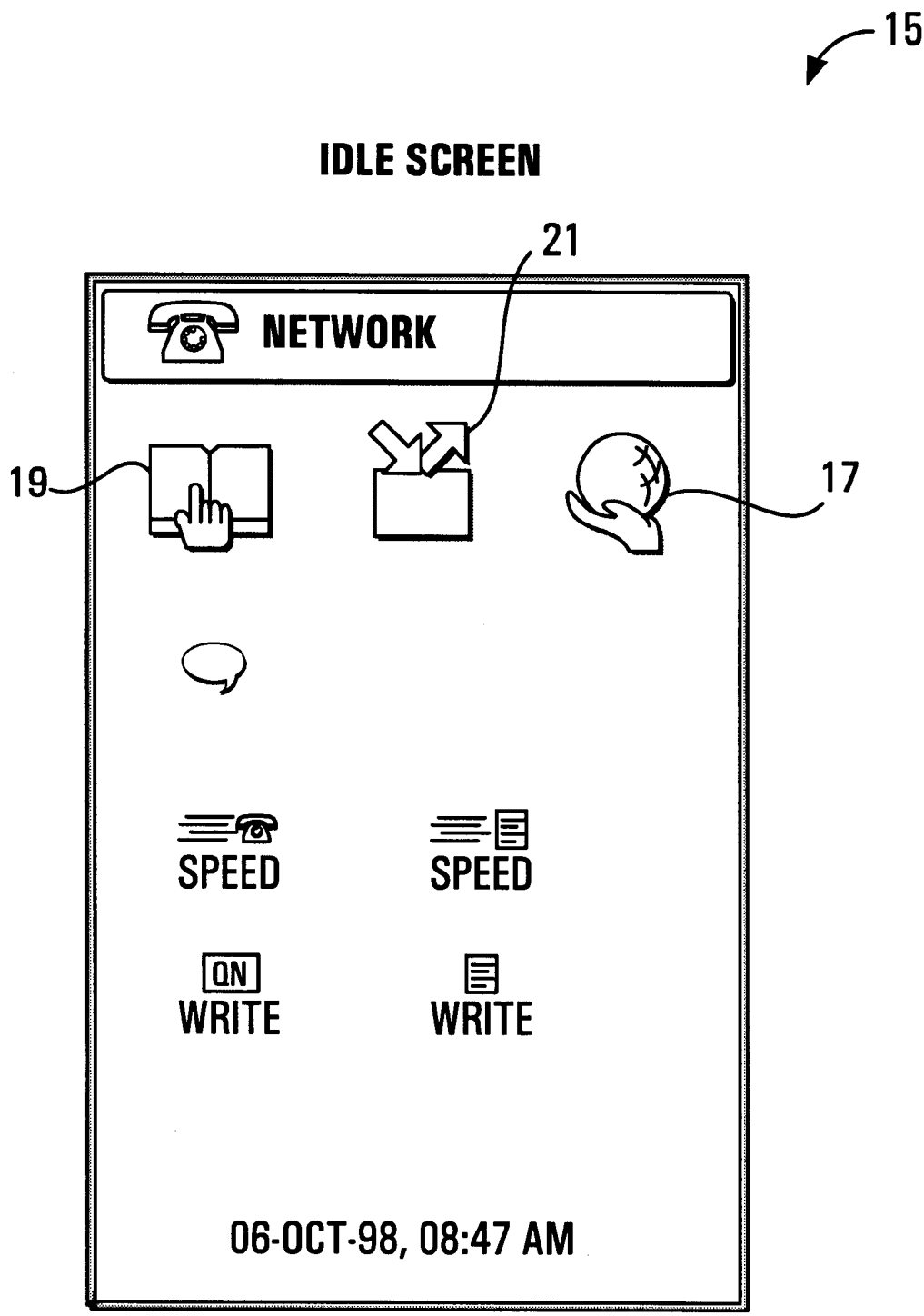
FIG. 2 is a representative window on a computer-based system screen showing an Idle screen when the computer application of the present application is launched, in accordance with an embodiment of the present invention.

FIG. 2 is an Idle window 15 which is a representative window of what might appear when the CBS application is launched or initiated. The Idle screen 15 displays a number of discreet icons or buttons, each button representing a different option available to the user. When a button is "selected", the particular function represented by the button is launched or initiated. A button is typically selected by touching the area of the screen over the button or by moving the mouse pointer over the button and clicking the mouse button. Many other methods for selecting a particular function or button are possible.

In this example, the main method relating to the invention is initiated by selecting the Services button 17. The other buttons (images) appearing on the Idle screen 15 could relate to any applications at all, and do not necessarily relate to the invention. For example, a Directory button 19 may be provide a user's personal directory information such as address information of the user's colleagues, fax numbers, e-mail addresses, etc. A Message button 21, for example, might access a user's e-mail inbox/outbox, etc. The other buttons (images) in Idle screen 15 will not be described.

If the Services button 17 is selected, the Services List screen 22 shown in FIG. 3.1 appears. The Services button 17 is shaded to show that it has been selected. If the user selects the Return to the Previous Screen button 23, the Idle screen 15 will be redisplayed.

The Services List screen 22 shows several services, each associated with one of two possible access points or service providers, namely "SP1" and "SP2". These services are associated with the SP1 access point, namely "Service A", "Service B" and "Browser". In other words, each of those three services is available through the SP1 access point.

The SP2 access point shows that two services, namely "Service X" and "Service Y", are available through the SP2 CBS.

Near the top portion of the Service List screen 22, the term "7 items" appears. In this example, 7 services are available to be selected from the Service List screen 22. Only five services are shown in FIG. 3.1. Further services and/or access points could be viewed by scrolling down on navigation key(s) (not shown) located on the CBS keyboard (not shown) or possibly by touching the screen over a down arrow 27, for example. It should be noted, although not shown, that services could be available locally (eg: on the user's own computer or server), and listed on the Service List screen 22. In that case, the local services would not be associated with an access point.

If Service A is selected, a Service Card screen 24, as shown in FIG. 3.2.1 appears. The service card 24 provides a summary of the selected service and various of its attributes such as its name, the name of the service provider, its cost (if any), the time and day of the user's last connection and the time and day when this service card was last edited or updated by the user. Any other information pertaining to that service could be included on the card 24. The service card 24 also provides a start button 25 (labelled "Service A" in this example) which, when selected, initiates the service (which would be Service A in this case), and could produce a Service screen 26 similar to that shown by the representative Service screen shown in FIG. 3.2.2, which shows a service called Joe's Travel Service. The contents of the service screen 26 (and further screens within the selected service) are generated by the particular selected service (Joe's Travel Service in this example) and the user's interaction with the selected service.

When viewing a service screen 26 such as that shown in FIG. 3.2.2, the user can select the Network button, which, in this example is labelled "SP1", which will display a user interface dialog screen (not shown), to provide feedback to the user about the current access point and the communication link. The user may also have the option of disconnecting from the current access point (SP1 in this example) or otherwise modifying parameters relating to the communication link.

Upon the user selecting a service, the Service Card screen 24 will not appear if the user has previously configured the application so as not to display the Service Card screen 24 automatically.

In general, whatever screen is currently being displayed, the user has the option of returning to the Service List screen 22 shown in FIG. 3.1, by selecting the Service 17 button of a current screen. The user can then select another service or return to a previous service or screen.

DETAILS AND OPTIONS

Editing a Service Card

When a Service Card 24 is displayed (eg: FIG. 3.2.1), the information appearing in the card 24 can be edited by selecting the "Edit" button which will display an Edit Service Card screen 28, similar to that shown in FIG. 3.3.1.

If the "Change Access Points" button is selected, a screen such as the Change Access Point screen 30 of FIG. 3.3.2 is displayed. By selecting one of the displayed Access Points ("SP1" or "SP3"), the user will now be able to access the current service through the just selected access point, rather than through the previous access point (assuming that the current service is available through the selected access point). When the user returns to the Services List screen 22 (FIG. 3.1) the service will now appear under the newly selected Access Point, and not the original access point. In other words, the newly selected access point is now associated with that service and will be used to access that service.

Other information displayed on the Service Card 24, such as the name of the service, for example, can also be edited by selecting the information to be edited. When that information has been selected, an Edit Service Info screen, such as the representative screen 34 of FIG. 3.3.3 is displayed which allows the user to edit the information by selecting appropriate letter keys 36 shown on the Edit Service Info screen 34 (by touching the area of the screen over the chosen letter keys by pen, finger, mouse pointer, keypad, etc). Other means are possible for inputting and editing this information such as, for example, by speech input.

When the "Done" button is selected (while in either the Change Access Point screen 30 or the Edit Service Info screen 34), the Service Card Edit screen 28 of FIG. 3.3.1 will reappear with the newly edited information shown in place of the original information. If the "Cancel" button is selected, the Service Card Edit screen 28 will reappear with the original information shown. The user can then choose to edit more information, as described above. If the user selects the "Done" button from the Service Card Edit screen 28, the Service Card 24 reappears with the newly edited information shown in place of the original information. If the "Cancel" button is selected from the Service Card Edit screen 28 (FIG. 3.3.1), the Service Card 24 reappears, with the original information shown (none of changes chosen by the user in the screens 28, 30 or 34 of FIGS. 3.3.1–3.3.3 will appear).

Searching

From the Services List screen 22 shown in FIG. 3.1, instead of scanning all of the available services (of which there could be a large number), the user could select the "Search" button to perform a keyword search, a URL (Uniform Resource Locator—ie: an Internet address) search or an access point search, for example. Other types of searches could be performed, depending upon any information available with respect to the services or access points. When the user selects the "Search" button, a Search screen 38, such as the example screen shown in FIG. 4.1 appears.

From the Search screen 38, if the user selects the "Cancel" button, the Services List screen 22 shown in FIG. 3.1 will be re-displayed.

The Search screen 38 shows, for example purposes, that two types of searches are available (an infinite number of possible searches, could, of course, be implemented). For example, if the user selects the "Name" search, the user will input the desired name of a service (by selecting the appropriate letters and symbols from the letter keys 36 of this screen 38. When the desired name has been input, the user selects the "Find" button of the screen 38.

Similarly, in this example, the user could also screen 38. In this case, after the desired subject matter has been input, the user selects the "Find" button of screen 38. A search will be conducted for the selected subject matter from the information listed on Service Card screen 24 (FIG. 3.2.1).

A search can produce three possible results: a single match, several matches or no matches.

Where the search locates two or more matches, a Multiple Matches screen 46, such as that shown in FIG. 4.2, appears providing a list of services having the service name or subject matter searched. If the user selects one of the matched services, the corresponding service card 24 appears, such as the representative Service Card shown in FIG. 3.2.1. If the user selects one of the Service button 17 or the "Done" button of the Multiple Matches screen 46, the Services List screen 22 shown in FIG. 3.1 will appear. If the user selects the "Search Again" button of the Multiple Matches screen 46, the Search screen 38 shown in FIG. 4.1 will reappear, for a further search.

Where the search produces a single match, a service card 24, such as that shown in FIG. 3.2.1 is displayed, relating to the particular service located. Alternatively, where a search produces a single match, a screen similar to the Multiple Matches screen 46 could appear, containing only the single match found.

Where the search locates no matches, a Feedback screen 48 such as that shown in FIG. 4.3 will appear, to indicate that no matches were found. (Alternatively, a screen similar to the Multiple Matches Screen 46 could be displayed, indicating that no matched entries were found and displaying a message to the user indicating that no matches were found.) By selecting the "OK" button of the Feedback screen 48, the user is returned to the Search screen 38 with the previous search string preferably appearing in the Search Box 40 for ease of modification. Alternatively, the "OK" button on the Feedback screen 48 could be omitted. Instead, the Feedback screen 48 could be displayed for a preset period of time and then automatically removed.

Browser

As shown in the example Services List screen 22 of FIG. 3.1, one of the services provided through SP1 is "Browser". Browser is an optional feature of the invention which is preferably an Internet browser, but could be designed as a browser for other networks. In this example, SP1 provides Internet access and the Browser service provides access to chosen or "bookmarked" Internet sites in addition to any other site input by the user.

Adding a Service to Services List

Figure 5:
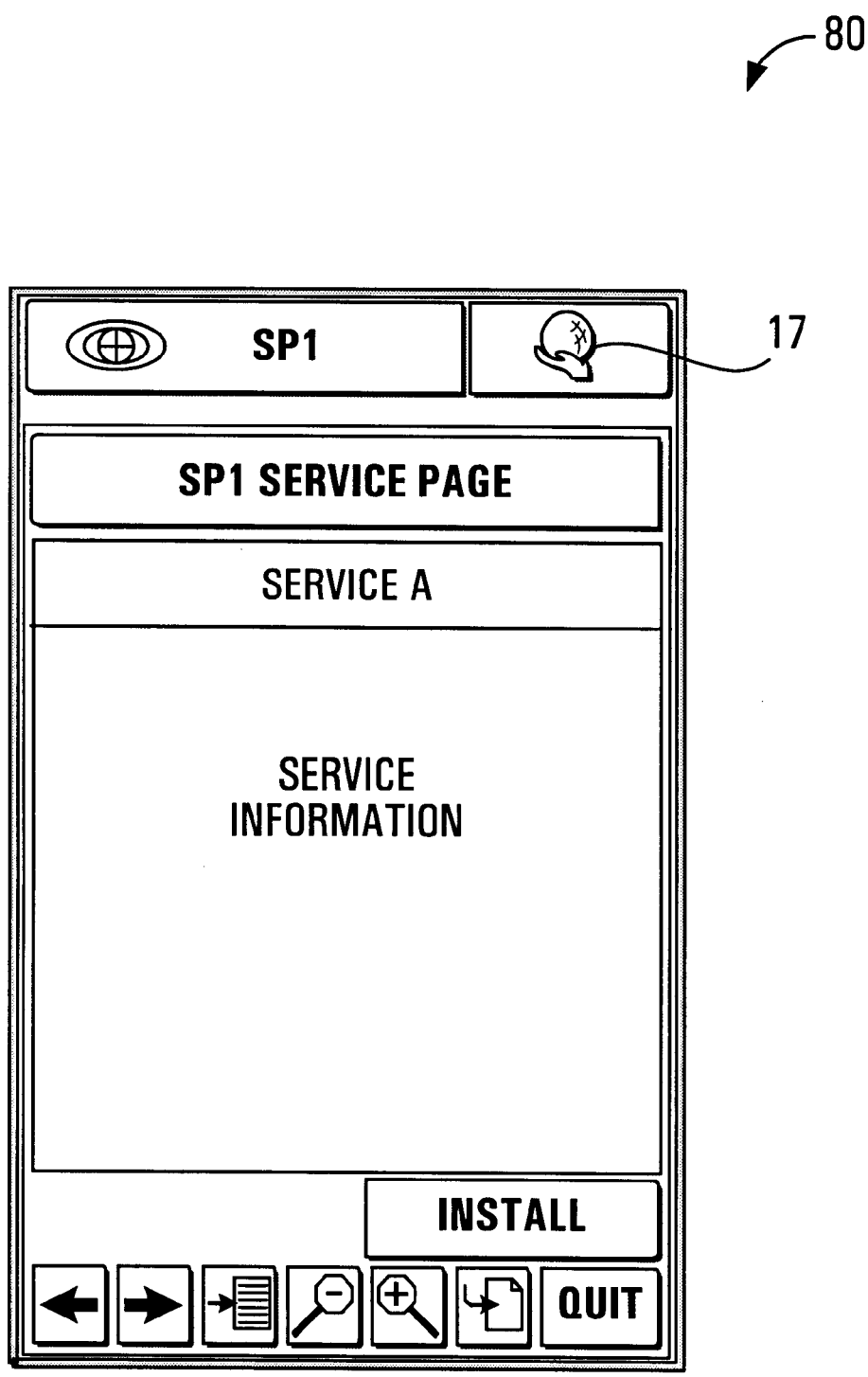
FIG. 5 is an example Service Page screen for the SP1 Access Point of FIG. 3.1.

From the Services List screen 22 shown in FIG. 3.1, if the user selects "SP1", for example, the SP1 Service page 80 will be displayed, an example of which is shown in FIG. 5. The information and layout of the Service page 80 is determined by the service provider (which in this example is SP1).

Figure 6:
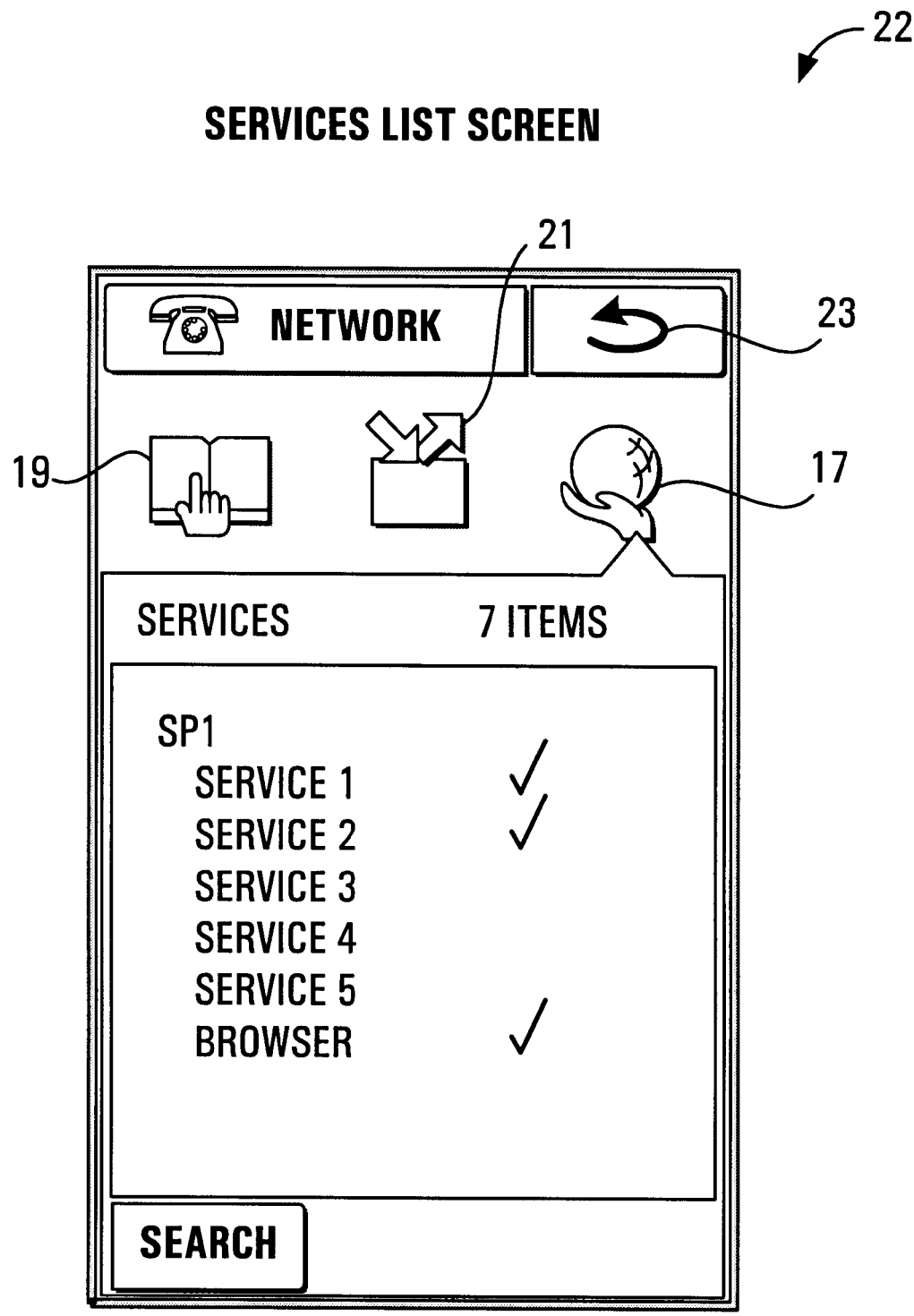
FIG. 6 is an example of another Service List screen than shown in FIG. 3.1.

There are many possible methods by which a service could be added to the Services List 22. Some of the possible methods are the following:

(a) software may be downloaded (by communication link or by physical media, such as a floppy disk) into the CBS as a file containing both a new service application itself and an information file specifying an access point to be associated with the service, the service then being automatically installed and associated with the access point;

(b) software may be downloaded as a file containing only the service application, and the user is queried as to which access point to use for the service;

(c) software may be downloaded as a file containing only the service application, and the access point currently accessed (if any) is associated with the service; and (d) a default access point may be assigned, either automatically by the CBS or by the user, and the default access point is thereafter automatically associated with all Using Multiple Services From the Same Access Point If, for example, SP1 offers five services and Internet access, the Services List screen 22 may appear similar to that shown in FIG. 6. The tick marks displayed on this screen indicate that "Service 1", "Service 2" and Browser are active. This means that the user previously selected and ran "Service 1" from the Services List screen 22 and then returned to the Services List screen 22 by selecting the Service button 17 (and not by selecting the "quit" button). Service 1 remains active in the background. The user then selected and ran "Service 2" from the Service List Screen 22 and then returned to the Service List screen 22 by selecting the Service button 17 (and not by selecting the "quit" button). Accordingly, both Service 1 and Service 2 remain active in the background. Therefore, for example, if Service 1 is a word processing application, and if the user had typed in one paragraph and then selected the Service button 17 and subsequently returned to Service 1, the previously typed-in paragraph would remain. However, had the user selected the "quit" button to exit from Service 1, upon returning to Service 1, Service 1 would be launched anew, with that paragraph having been lost.

Therefore, FIG. 6 shows the situation where Service 1 and Service 2 are active in the background, the active services being indicated by check marks. By selecting one of the active services, the user will be returned to the service in the same form as if the service had not been placed in the background.

From the Service List screen 22 shown in FIG. 6, the user can also select any of the non-active services (ie, services 3–5) which can be launched as described above with respect to FIG. 3.1.

Using Multiple Services From Different Access Points

As described in the preceding section, from a single access point, the user can have a number of services active in the background (shown by tick marks beside the service in the Service List screen 22), and can easily return to an active service or select a new service. The user can also select services from different access points.

For example, considering the Services List screen 22 shown in FIG. 3.1, if the user selects "Service A" associated with the SP1 access point and then the user returns to the Service List 22 (by selecting the Service button 17), a tick mark would appear beside "Service A" to indicate that Service A remains active in the background, as shown in FIG. 7.1.

The user can now select, for example, Service X from the SP2 access point. The service would be launched as described above. The user could then return to the Service List screen 22 leaving both Service A and Service X active in the background (in which case, a tick mark would appear beside each in the Service List screen (not shown)).

However, because each active access point requires one communication link, in order for both Service A and Service X to be active at the same time, there must be at least two communication channels (which could be telephone lines, wireless links, LAN interfaces, etc.) available (one to access SP1 and another to access SP2). If two communication links are available, the user should not notice any difference between accessing an active service from SP1 and accessing an active service from SP2. However, if only one communication link is available, then the user will be unable to access both SP1 and SP2 at the same time.

Accordingly, if only one communication link is available and if Service A is active in the background, as shown in FIG. 7.1, and the user selects Service X, which is provided through a different access point, a Network Conflict screen 84, such as that shown in FIG. 7.2.1, will appear. The Network Conflict screen 84 informs the user that there are insufficient communication links to connect to both access points simultaneously. Accordingly, the user is given the option of proceeding with launching Service X, by selecting the "Yes" button from the Network Conflict screen 84 (thereby disconnecting from the SP1 access point and Service A will be no longer be active). If the user selects the "No" button from the Network Conflict screen 84, Service X will not be launched and the Service List screen 22 as shown in FIG. 7.1 will be redisplayed.

If, for example, two communication links are available and two access points are currently active (eg: SP1 and SP2), then if the user attempts to launch a service from a third access point, a Network Conflict screen 84 similar to that shown in FIG. 7.2.1 will be displayed giving the user the option of disconnecting from SP1, disconnecting from SP2 or not launching the new service. A similar approach can be extended to any number of access points and communication links.

It should be noted that voice calls (telephone calls, for example) may be treated in the same manner as any other service requiring a communication link. For example, if the CBS can accommodate voice calls and if only one communication link is available, and if Service A is active, as shown in FIG 7.2.1, then if the user is to receive or send a voice call, the user is given the option of disconnecting from SP1 (to make or receive the call) or else, not making or receiving the call, as shown in FIG. 7.2.2. Similarly, if the user is making a voice call, and during the call the user selects a service associated with SP1, then the user is given the option of disconnecting from the voice call or not accessing SP1, as shown in FIG. 7.2.3. Many modification are, of course, possible. For example, the application could be set up, for example, so that any incoming voice call automatically causes disconnection from an active access point, if there is an insufficient number of access points to connect with the voice call without disconnecting from an active access point.

Adding/Deleting/Enabling/Disabling/Configuring Access Points

To modify any parameters associated with an access point, including adding or dropping an access point, the user selects the settings key 16, for example, from the CBS keyboard, which will cause the Choose Access Point screen 86 to appear, as shown in FIG. 8.1. In this example, two access points are shown, namely SP1 and SP2. If any of the access points is selected, the Setup Options screen 88 of FIG. 8.2 appears.

From the Setup Options screen 88 of FIG. 8.2, if the "General Settings" button is selected, the General Settings screen 90 shown in FIG. 8.3 appears. If the user wishes to edit the "SP Name" field (this is the name of the service provider that would appear in the Services List screen 22 of FIG. 3.1, for example), the user selects "SP Name", which initiates the Change Setup screen 94 shown in FIG. 8.4. The user can then edit the current name by selecting the letter buttons 36 shown on the screen 94.

FIG. 8.3 also shows that the user can edit the user ID. As well, by scrolling down, the user can add or edit other settings relating to the access point such as the password.

The button "Auto Log In" in the General Setting screen 90, if selected, means that when the user selects a service provided by SP1, the user will not be prompted for the user ID or password to access the service. Instead, the user ID and password will be provided automatically to the service provider, transparent to the user. However, if the user de-selects "Auto Log In" from the General Settings screen 90, the user will be prompted to provide the user ID and password (if applicable) when the user attempts to access a service associated with the access point.

The "Internet Capable" button shown in the General Settings screen 90 of FIG. 8.3 means that the current access point is Internet capable (ie: the service provider can support services available on the Internet). As will be described below, this information is helpful if the user decides to disable a first access point, but wishes to reassign the first access point's Internet dependent services to a second access point.

If the "Dialup Options" button is selected from the Setup Options screen 88 (FIG. 8.2), the Dialup Options screen 96 shown in FIG. 8.5 appears. This screen 96 allows the user to add or edit various options such as, for example, the dialup number for the access point, or the number of times the dialup number will be called if the number is busy or otherwise unavailable. This screen 96 also allows the user to specify a connection type (for example, ISDN line vs. analog line, etc.). The user can also specify the baud rate (that is, the rate at which information is transferred through the communication hardware and/or software). "Login Script" is a macro created by the user with respect to the steps for accessing the access point.

If the "Network Options" button is selected from the Setup Options screen 88 of FIG. 8.2, the Network Options screen 98 of FIG. 8.6 will appear, allowing the user to modify various network parameters such as those shown.

If the "TCP/IP Options" button is selected from the Setup Options screen 88 of FIG. 8.2, the TCP/IP Options screen 100 of FIG. 8.7 will appear, allowing the user to add or edit TCP/IP options such as those shown.

In order to connect to an access point, the access point must be "enabled". In order to enable an access point, the user may provide the relevant information described above with respect to the screens shown in FIGS. 8.1 to 8.7. Although for some of the options, default, or pre-configured, values provided by the CBS program may be used; in other cases, the access point cannot be accessed without the user having previously provided valid information (such as the dialup number, for example). Preferably, when the user selects the Enable button from the General Settings screen 90 of FIG. 8.3, a message will appear on the screen, such as a message 104 shown in Enable Info screen 97 (FIG. 8.8) to remind the user that a valid User ID and password must be provided if the user wishes, thereafter, to "transparently" use the access point.

When an access point is enabled, the access point name may appear on the Service List screen 22 shown in FIG. 3.1, with previously chosen services listed below the name of the access point.

When an access point is enabled, and the General Settings screen 90 is called up, instead of displaying an "Enable" button as shown in FIG. 8.3, the screen will display a "Disable" button, as shown in FIG. 8.9. If the Disable button is selected, the Disable screen 106 shown in FIG. 8.10 will appear, to allow the user to decide what to do with the services associated with that access point. If the user selects the Delete All button, then, for example, if the screen relates to SP2 of FIG. 3.1, when the user returns to the Services list of FIG. 3.1, SP2 would be deleted along with Service X and Service Y.

However, if the Reassign All button is selected from the Disable screen 106 of FIG. 8.10, the Reassign Services screen 108 of FIG. 8.11 appears, allowing the user to reassign the services currently accessible through SP2 to a different access point. For example, assuming Service X and Service Y could also be accessed through SP1, then if the user reassigns SP2's services to SP1, by selecting SP1 from the Reassign Services screen 108 of FIG. 8.11, upon returning to the Service List 22 of FIG. 3.1, SP2 would be deleted, but service X and service Y would now appear under SP1 (this assumes that Service X and Service Y are also provided through SP1).

From the Setup screen 86 of FIG. 8.1, if the user selects the More SP button, a More SP list 110 of other previously saved access points is displayed for possible configuring or editing, as shown in FIG. 8.12. As well, the user has the option of adding and manually configuring new access points, by selecting a New SP button, which will initiate a General Settings screen 90 as shown in FIG. 8.13 (similar to FIG. 8.3), with default values automatically filled in, which can be edited by the user. As well, as noted above, particular access points can be pre-configured.

Many other options relating to access points are conceivable and could be incorporated within the application (not shown). For example, the user could be given options as to how to order the list of services displayed in the Services List 22 (FIG. 3.1). For example, the services could be listed alphabetically by name, by the order in which they were most recently accessed, etc. Another possible option is to allow the user to specify the time after which an access point will automatically be disconnected for non-use.

Use of Access Point Information by Services

Any service listed in the Services List 22 could be implemented to take advantage of information associated with an access point through which it operates. For example, an Internet browser application could use a proxy address associated with the access point through which it operates, or a service could modify its communication strategy depending upon a baud rate used for its associated access point. Accordingly, a service may be adapted to take advantage of attributes of the access point through which it operates without direct user intervention.

IMPLEMENTATION

The above-described method and system could be implemented in an infinite number of ways. For example purposes, one high level implementation is outlined as follows.

Each service (for example, each of the services shown in the user interface of Services List 22 of FIG. 3.1) is represented, at the programming level, by a Service Object 124 as shown in FIG. 9.1. The Service Object 124 shown in FIG. 9.1 is one of many possible types of data structures which could be designed to contain relevant information about a service such as an Access Point through which it is accessed, the name of the service, the cost of the service, if any, the date of the last connection to this service, etc. While, for example purposes, the Service Object 124 of FIG. 9.1 is shown as a table, the Service Object 124 could also be implemented as other data structures such as, for example, a linked list.

Similar to the Service Object 124, an Access Point Object 126 is a data structure incorporating relevant information about an access point, such as its address or telephone number, communications protocols, password and user ID as shown in FIG. 9.2. While the Access Point Object 126 as shown in FIG. 9.2 is depicted as a table, the Access Point Object 126 could be implemented as many other types of data structures. Relevant information from the Access Point Object 126 is provided to the communication hardware and/or software to connect with the access point.

Figure 10:
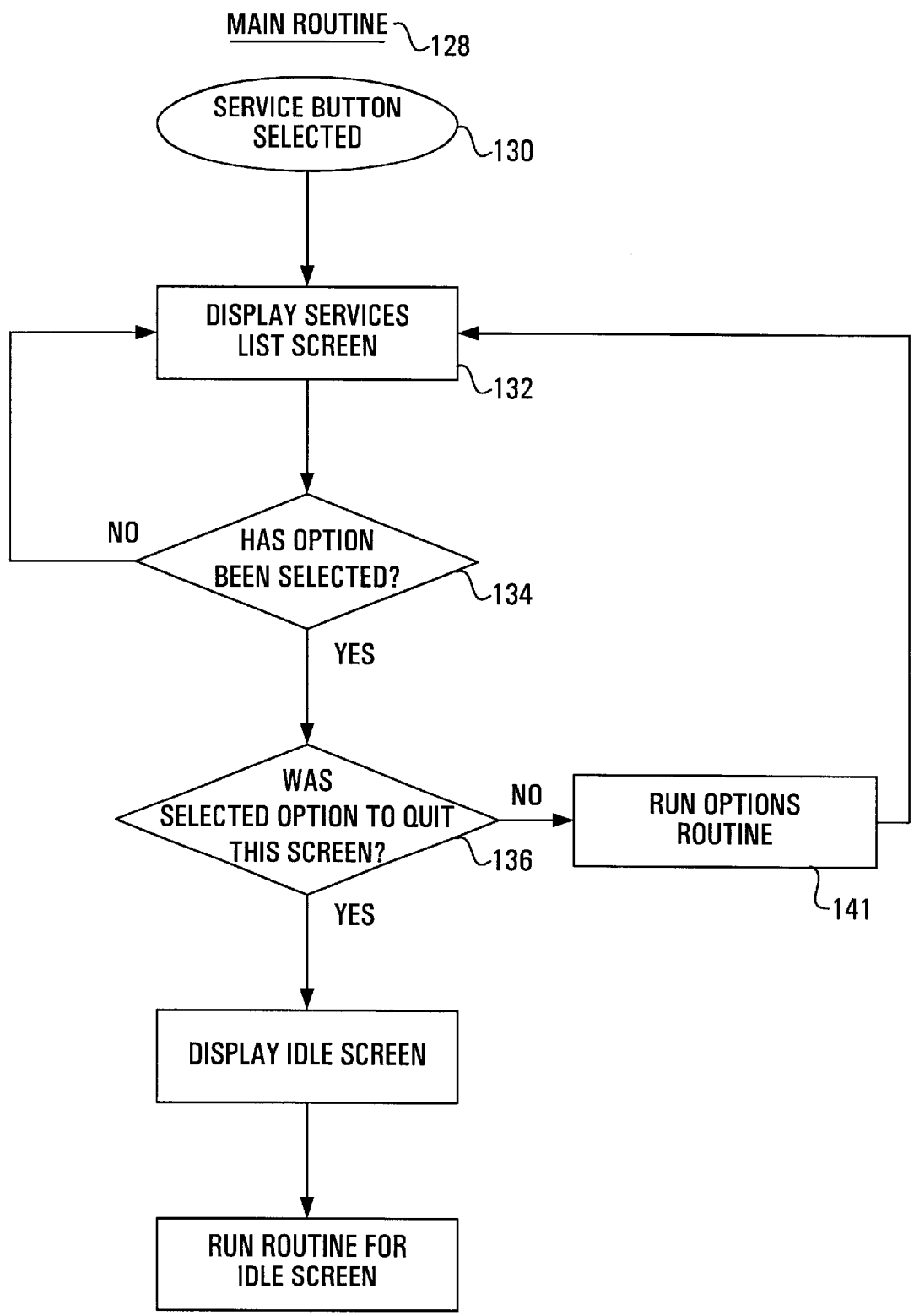
FIGS. 10 and 11 are flow charts relating to the Service List screen of FIG. 3.1.

FIGS. 10–14 are flow charts showing a possible implementation of many of the features described above. FIG. 10 is a flow chart of the Main Routine 128 showing what happens after the Service button 17 is selected from the Idle screen 15 of FIG. 2 (or after the Service button 17 is selected from another screen). After the Service button 17 has been selected (step 130), the Services List screen 22 (eg: FIG. 3.1) is displayed (step 132). The application will then wait until the user has selected an option. If the user selects the Return to the Previous Screen button 23, the Idle screen 15 of FIG. 2 will be displayed and the routine for implementing that screen will be executed (not described).

Figure 11:
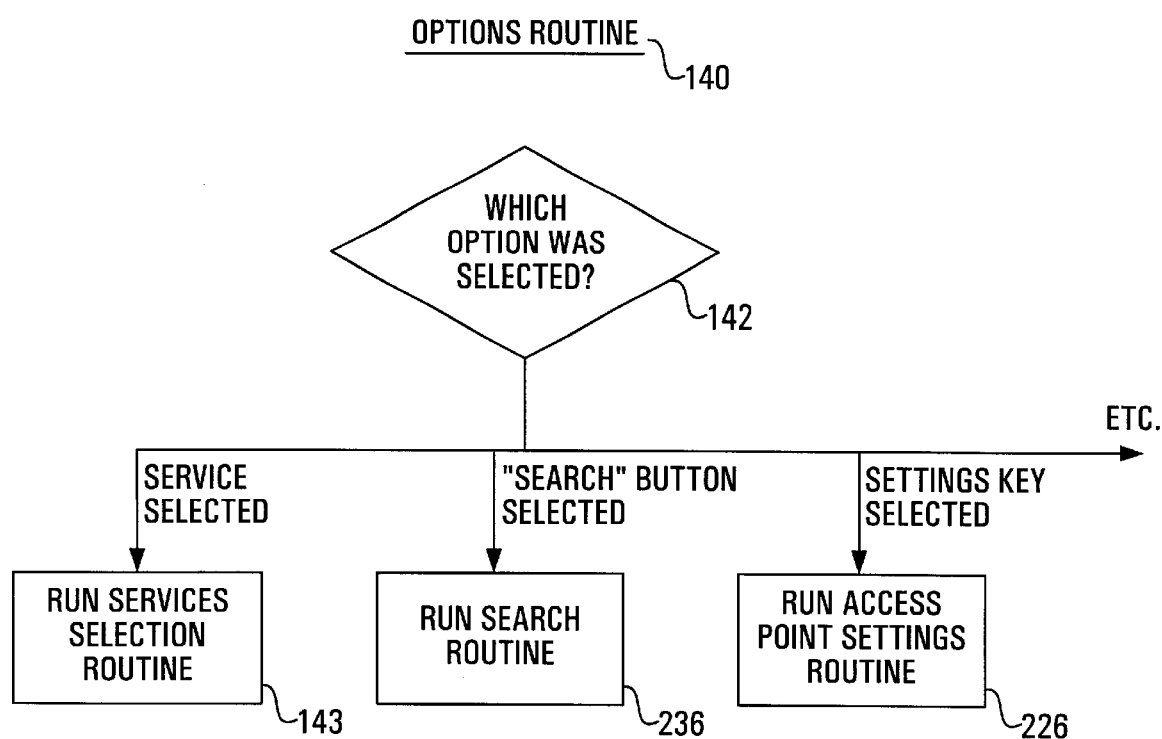
Figure 13:
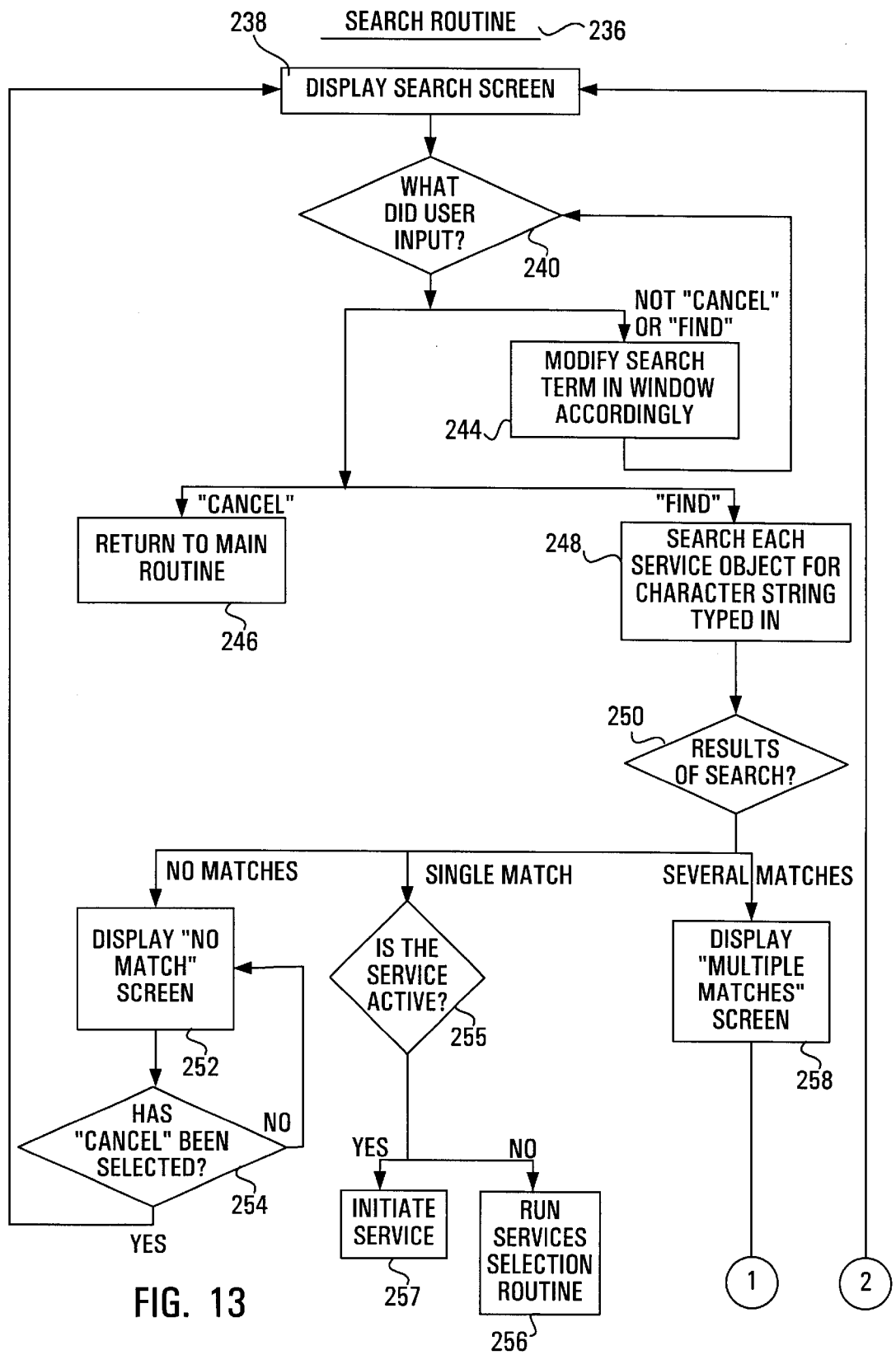
FIG. 13 is a flow chart relating to the search function of the Service List screen of FIG. 3.1.

At step 134 of FIG. 10, if a button other than the Return to the Previous Screen button 23 is selected (step 136), the Options Routine 140 is executed at step 141, as shown in FIG. 11. As shown at step 142 of the Options Routine 140, the application will execute a routine according to the option selected. The implementation of most of the first three options shown in FIG. 11 (ie, steps 143, 224, 226) will be described in some detail. The other possible options (not shown), which would be similarly implemented, will not be described.

Services Selection Routine 144

If the user selects one of the services (eg: Service A or Service X, for example, from the Services List 22 of FIG. 3.1), then at step 143 of the Options Routine 140, the Services Selection routine 144 will be executed, as shown in FIG. 12.1.1. In this routine 144, the Service Card 24 relating to the selected service is displayed (step 146), using the information from the current service's Service Object 124. A sample Service Card 24 is shown in FIG. 3.2.1.

At step 148, the application waits until the user selects an option from the Service Card 24.

Service Button 17 Selected

If the Service button 17 is selected from the Service Card 24 (step 150), the application returns to the Main Routine 128 (FIG. 10).

Start Button 25 Selected

If the Start button 25 is selected from the Service Card 24, the application must determine, at step 152 of FIG. 12.1.1, if the service requires a connection to a new access point. If the service can be accessed through a current connection (ie: the access point is currently connected to the user's CBS), then the service can simply be initiated (step 154). The instructions to initiate the service are incorporated within a macro stored in the Service Object 124 relating to this service.

After the Start button 25 is selected, if the access point for the selected service is not currently connected, then at step 156, the application determines if another communication link is available. If another communication link is available, then the Initiate Connection with New Access Point Routine 158 is executed (step 157), as shown in FIG. 12.1.2.

As shown in FIG. 12.1.2, first, the Access Point Object 126 is located (step 160). The communication address (eg: telephone number) for the access point, which is stored in the Access Point Object 126 is provided t o the communication hardware and/or software (step 164). At step 166, if the telephone (or other communication) link to the access point is busy (or otherwise unavailable) the application will attempt to call again (step 168). Once a connection is established, using the macro stored in the Access Point Object 126, relevant information, in the relevant order, is provided to the access point for connection therewith (step 170). Upon successful connection, the service is launched or initiated, as described above at step 154.

If, at step 156 of the Services Selection routine 144 (FIG. 12.1.1), it is determined that another communication link is not available, then at step 173 a Connection Conflict Routine 174, as shown in the flow chart of FIG. 12.1.3, is initiated. As shown in FIG. 12.1.3, a Network Conflict screen 84, similar to that shown in FIG. 7.2 is displayed at step 176 and the application will wait for the user to select an option (step 178). If there are two or more access points currently connected, the Network Conflict screen 84 will provide the user with the choice of disconnecting or dropping any one of the current access points.

If the user selects an option to drop one of the currently active access points, then at step 180, that active access point will be disconnected. All services from that dropped access point which had been active in the background will also be dropped. In the preferred embodiment, prior to disconnection, a warning message will be displayed (not shown) encouraging the user to save any necessary information from the services which will be quit if the access point is dropped. After the selected access point has been dropped, the Initiate Connection with New Access Point Routine 182, as described above, and as shown in FIG. 12.1.2 is executed. Then, the Initiate Service step 154, as described above with respect to FIG. 12.1.1 is executed.

If at step 178 of the Connection Conflict Routine 174 (FIG. 12.1.3) the user chooses not to drop an active access point (ie: the user has chosen not to initiate the newly chosen service which requires a new access point), the application returns to the Main Routine 128.

"Edit" Selected

If the user selects "Edit" at step 148 of the Services Selection Routine 144 of FIG. 12.1.1, then at step 183, the Edit Routine 184 is executed. As shown in the flow chart of FIG. 12.2, first, the Service Card Edit Screen (eg: FIG. 3.3.1) is displayed (step 186). Step 188 considers what option the user has selected.

"Change Access Point" Button Selected

The Access Point Options screen 30 (FIG. 3.3.2) is displayed (step 190). Step 192 considers what option the user has selected. If the user selects one of the access points (eg: "SP1" or "SP3" from FIG. 3.3.2), then the selected access point is highlighted (step 194), and the application returns to step 192 to await the next option selected by the user (ie: the access point is only actually changed when the user selects "done" as described below) . If the user selects "Cancel" at step 192, then the application returns to the beginning of the Edit Routine 184. If the user selects "Done" at step 192, and if the user had previously selected a new access point at step 194, then at step 196 the "access point" field of the Service Object 124 relating to the current service is updated with the access point selected at step 194. The application then returns to the beginning of the Edit Routine 184.

"Cancel" Button Selected

If at step 188 of the Edit Routine 184 (FIG. 12.2) the "Cancel" button is selected, then at step 197, the application returns to the beginning of the Services Selection Routine 144.

"Done" Button Selected

If at step 188 of the Edit Routine 184 (FIG. 12.2) the "Done" button is selected, and if the "temp" record has been modified (as described below at step 206), the current Service Object 124 is updated from the data in the "temp"record (step 198). Then, at step 197, the application returns to the beginning of the Services Selection Routine 144.

Anything Else Has Been Selected

If at step 188 from the Edit Routine 184 (FIG. 12.2) anything else has been selected, the user has intended that the selected information is to be modified. Accordingly, the Edit Service Info Screen 34 (FIG. 3.3.3) is displayed at step 200, with the selected information appearing in the window 35 of the screen 34, to be modified by the user. At step 204, the application waits for the user to select an option. Any changes input by user to the information in the window 35 are saved at step 206 in a temporary record "temp" and the application waits for the next Selection by the user (step 204). If the user selects "Cancel", the application returns to the beginning of the Edit Routine 184. If the user selects "Done", and if the "temp" record has been modified (as described at step 206), the current Service Object 124 is updated from the data in the "temp" record (step 208) and the application returns to the beginning of the Edit Routine 184.

"Delete" Selected From Service Card 24 If "Delete" is selected from the current Service Card 24 at step 148 of the Services Selection Routine 144 (FIG. 12.1.1), preferably, a warning screen (not shown) will appear asking the user to confirm that the current service is to be deleted. If confirmed, then at step 210, the Delete Routine 212 will be initiated. As shown in the Delete Routine 2 12 flow chart of FIG. 12.3, the Service object relating to the current service is deleted (step 216). Then, at step 218, the application will return to the beginning of the Main Routine 128 (FIG. 10) by displaying the Services List Screen 22, which will no longer include the just deleted service.

Search Routine 236

If the "Search" button is selected from the Services List screen 22 (FIG. 3.1) at step 142 of FIG. 11, then at step 224, the Search Routine 236 is executed. As shown in the flow chart of FIG. 13, the Search screen 38 (FIG. 4.1) is displayed as shown at step 238. At step 240, the application allows the user to type letters or symbols to form a keyword to be searched, and the search term shown in the window 40 of the Search screen 38 changes accordingly (step 244).

If at step 240 the user selects the "Cancel" button, then at step 246, the application returns to the Main Routine 128 by displaying the Services List screen 22 and continuing as shown in the flow chart of FIG. 10.

If at step 240 of the Search Routine 236 the user selects the "Find" button, then at step 248, the application will search the appropriate field of each Service Object 124 for a match with term shown in the search window 40 of the Search screen 38. The next step 250 depends upon whether zero, one or more than one Service Objects 124 match the search term.

If the search term in the window 40 is not found in any of the Service Objects 124, then a Feedback screen 48 (FIG. 4.3) will be displayed indicating that no match was found (step 252). When the user selects the "Cancel" button on the Feedback screen 48 (step 254), the application returns to the beginning of the Search Routine 236.

If the search term in Search window 40 is only located in a single Service Object 124, then from step 255, if the service is active, the service is initiated at step 257; otherwise, if the service is not active, at step 256, the Services Selection Routine 144 is executed for the located service.

If the search term in the Search window 40 is located in more than one Service Object 124, then, as shown at step 258, the Multiple Matches screen 46 (FIG. 4.2) is displayed showing all of the services having the search term in the relevant field. At step 260, the application waits for the user to select the next option.

If the user then selects either of the services button 17 or the "Done" button, then at step 262, the application will return to the beginning of the Main Routine 128.

If the user selects one of the listed services, then from step 263, if the service is active, the service is initiated at step 265; otherwise, if the service is not active, then at step 264, the Services Selection Routine 144 is executed for the located service.

If the user selects the "Search Again" button, the application will return to the beginning of the Search Routine 236.

Access Point Settings Routine 266

If the Settings key 16 on the CBS keyboard is selected at step 142 of the Options Routine 140 (FIG. 11), the Access Point Settings Routine 266 is executed as shown in the flow chart of FIG. 14.1. At step 268, the Access Point Setup screen 86 (FIG. 8.1) is displayed, which shows the enabled access points. The application then waits, at step 270, for the user to select one of the following options.

An Access Point is Selected —FIG. 14.2.1

From step 270, if one of the enabled access points is selected, the Setup Options Routine 274 is executed at step 272, as shown in the flow chart of FIG. 14.2.1. As shown in FIG. 14.2.1, the Setup Options screen 88 (FIG. 8.2) is displayed (step 276). At this point, step 278, the user can select one of the following options:

General Settings Selected—FIG. 14.2.2.1

From step 278 of the Setup Options Routine 274 (FIG. 14.2.1), if the General Settings option is selected, then at step 280, the General Settings Routine 284 is executed. As shown in the flow chart of FIG. 14.2.2.1, the General Settings screen 90 (FIG. 8.3) is displayed (step 286) which shows the parameters that relate to a particular access point (each of the possible settings is a field in the Access Point Object 126). If the current Access Point Object 126 already exists, then the General Settings screen 90 will reveal the information from the relevant fields of the current Access Point Object 126. If the current Access Point Object 126 is new (ie: the user is defining a new access point), then the fields in the General Settings screen 90 will be blank or will contain default, or pre-configured, values where appropriate, if the application was pre-programmed to provide default or pre-configured values.

At step 288 of the General Settings Routine 284, the application will wait for the user to select an option.
Option in Window 91 Selected At step 288 of FIG. 14.2.2.1, if the user selects one of the settings options shown in the window 91 of the General Settings screen 90, the Change Setup Routine 292 is executed at step 290. As shown in the flow chart of FIG. 14.2.2.2, at step 294, the Change Setup screen 94 (FIG. 8.4) is displayed, with the selected option shown in the edit window 95. At step 296, the application waits until the user selects an option.

If the "Cancel" button is selected, then as shown at step 298, the application returns to the beginning of the previous routine without modifying any fields in the current Access Point Object 126.

If the "Close" button is selected, then as shown at step 300, the Access Point Object 126 is updated with the information in the "temp" record (the "temp" record is described below in step 308), and then at step 304, the application returns to the beginning of the previous routine. If any other option is selected, the selected option shown in the edit window 95 is modified accordingly (step 306) and the change is recorded in a temporary record "temp"(step 308) which may be used in previously described step 300 to update the current Access Point Object 126 accordingly.
"Auto Log In" or "Internet Capable" Selected In FIG. 14.2.2.1, from step 288 from the General Settings Routine 284, if the user selects either "Auto Log In"or "Internet Capable" on the General Settings screen 90, then at step 310, the current Access Point Object 126 is modified accordingly.
"Enable" Button Selected In FIG. 14.2.2.1, from step 288 from the General Settings Routine 284, if the user selects the "Enable" button on the General Settings screen 90, then at step 312, the Enable Info screen 97 (FIG. 8.8) is displayed.
"Delete" Button Selected In FIG. 14.2.2.1, from step 288 of the General Settings Routine 284, if the user selects the "Delete" button on the General Settings screen 90, then at step 313, the application considers whether or not there are any services associated with the current access point. If there are not, then at step 315 the Access Point Object 126 relating to the current access point is deleted and the application returns to the top of the Access Point Settings Routine 266 (FIG. 14.1). If there are services associated with the current access point, then at step 314, the Reassign/Delete Routine 316 is executed. As shown in the flow chart in FIG. 14.2.3.1, the Reassign/Delete screen (FIG. 8.10) is displayed (step 318). The application then waits at step 320 for the user to select an option.
"Reassign All" Button Selected From step 320 of FIG. 14.2.3.1, if the "Reassign All" button is selected, then at step 324 the Reassign Service Routine 326 is executed. As shown in the flow chart of FIG. 14.2.3.2, the Reassign Services screen 108 (FIG. 8.11) is displayed (step 328), listing available access points other than the current access point. At step 330, the application waits for the user to select an option.

If one of the displayed access points is selected, then at step 334 of the Reassign Services Routine 326, all of the services associated with the current access point are reassigned to the chosen access point (ie: all of the relevant Service Objects 124 are modified to replace reference from the access point to be deleted with the chosen access point).

If at step 330 of the Reassign Services Routine 326 (FIG. 14.2.3.2) the "Close" button is selected, the application returns to the beginning of the previous routine, as shown at step 336.

If at step 330 of the Reassign Services Routine 326 the "More SP" button is selected, any other possible access points not already displayed, will be displayed (step 338), and the application then returns to step 330 of the Reassign Services Routine 326 to consider which option is selected by the user.

"Delete All" Button Selected

In FIG. 14.2.3.1 from step 320, if the "Delete All" button is selected in the Reassign/Delete screen 106 (FIG. 8.10), then as shown at step 340 of FIG. 14.2.3.1, all of the Service Objects 124 associated with the current Access Point Object 126 are deleted. Then, at step 344, the current Access Point Object 126 is deleted. As shown at step 346, the application then returns to the beginning of the Access Points Setting Routine 266.

"Cancel" Button Selected

In FIG. 14.2.3.1 from step 320, if the "Cancel"button is selected in the Reassign/Delete screen 106 (FIG. 8.10), then as shown at step 348 of FIG. 14.2.3.1, if the "Cancel" button is selected, the application returns to the beginning of the previous routine.

Other Options Selected From FIG. 14.2.1

In FIG. 14.2.1 from step 278, on the Setup Options screen 88 (FIG. 8.2), the user may select an option other than "General Settings". The implementation of the other possible options from the Setup Options Screen 88 (FIG. 8.2), namely "Dialup Options", "Network Options", "TCP/IP Options" and "Close"(steps 350, 352, 354 and 356) will not be described, because in view of the above description of the Setup Options Routine 274, and in view of the description of FIGS. 8.5 to 8.11, the implementation would be obvious to a person skilled in the art.

Numerous modifications and variations of the present invention are possible in light of the above teachings. It is therefore to be understood that within the scope of the appended claims, the invention may be practised otherwise than as specifically described herein.

What is claimed is:

1. In a programmable computer-based system ("CBS") comprising communication hardware and software and one or more communication links, a method of allowing a user of the CBS system to access services provided through access points, wherein the method comprises:

displaying a user interface with a list of available services provided through the access points;

if a user selects from the user interface a first service provided through a first access point, then, without further input from the user, connecting to the first access point and launching the service;

if a user selects from the user interface one or more other services provided through the first access point while the CBS is connected to the first access point, then, without further input from the user, launching the one or more other services;

if a user selects from the user interface a further service from a second access point while the CBS is connected to the first access point, then if a communication link is available for connection to the second access point, without further input from the user, connecting to the second access point and launching the further service from the second access point; otherwise, if a communication link is unavailable for connection to the second access point, querying the user as to whether the user wishes to connect to the second access point or remain connected to the first access point and if the user responds wishing to connect to the second access point, then, without further input from the user, disconnecting from the first access point, connecting to the second access point and launching the further service from the second access point.

2. The method of claim 1, further comprising, if the CBS system is connected to n access points, where n is an integer greater than or equal to two, through n communication links, and the user selects from the user interface an additional service provided through an n+1th access point, and if an n+1th communication link is available, then, without further input from the user, connecting to the n+1th access point and launching the further service; otherwise, if an n+1th communication link is unavailable for connection to the n+1th access point, querying the user as to whether the user wishes to connect with the n+1th access point or remain connected to the n access points and if the user responds wishing to connect with the n+1th access point, querying the user as to which of the n access points the user wishes to disconnect from and upon the user selecting an access point to disconnect from, without further input from the user, disconnecting from the access point to disconnect from, connecting to the n+1th access point and launching the further service from the n+1th access point.

3. The method of claim 2, wherein the method maintains (a) for each access point, an Access Point Object, wherein the Access Point Object comprises a data structure for storing information including information for connecting with the access point and information for accessing services associated with the access point; and (b) for each service, a Service Object, wherein the Service Object comprises a data structure for storing information including an access point associated with the service, and parameters for launching the service.

4. The method of claim 3 wherein the information for connecting with the access point and information for accessing services associated with the access point comprise: a connection address, a user ID, a password, network configuration parameters and proxy parameters.

5. The method of claim 3, wherein connecting to an access point comprises determining if a communication link is available;

if a communication link is available, obtaining from an Access Point Object associated with the access point and providing to the communication hardware and software the information for connecting with the access point.

6. The method of claim 4 wherein when a connection has been established with the access point, providing to the access point the password and the user ID associated with the Access Point Object.

7. A computer-readable medium containing a computer program that when loaded into a computer-based system ("CBS"), the CBS comprising communication hardware and software and one or more communication links, adapts the CBS to allow a user to access services provided through access points, wherein the program provides access to the services according to the following steps:

providing the user with a user interface displaying a list of available services provided through the access points;

if a user selects from the user interface a first service provided through a first access point, then, without further input from the user, connecting to the first access point and launching the service;

if a user selects from the user interface one or more other services provided through the first access point while the CBS is connected to the first access point, then, without further input from the user, launching the one or more other services;

if a user selects from the user interface a further service from a second access point while the CBS is connected to the first access point, then if a communication link is available for connection to the second access point, then, without further input from the user, connecting to the second access point and launching the further service from the second access point; otherwise, if a communication link is unavailable for connection to the second access point, querying the user as to whether the user wishes to connect to the second access point or remain connected to the first access point and if the user responds wishing to connect to the second access point, then, without further input from the user, disconnecting from the first access point, connecting to the second access point and launching the further service from the second access point.

8. The computer-readable medium of claim 7 providing access to services wherein one or more of the services is a voice call service.

9. The computer-readable medium of claim 8, wherein if the user, using the program, is connected to n access points, where n is an integer greater than or equal to two, through n communication links, and the user selects from the user interface an additional service provided through an n+1th access point, if an n+1th communication link is available, the computer program, without further input from the user, connects to the n+1th access point and launches the further service; otherwise, if an n+1th communication link is unavailable for connection to the n+1th access point, the program queries the user as to whether the user wishes to connect with the n+1th access point or remain connected to the n access points and if the user responds wishing to connect with the n+1th access point, the program queries the user as to which of the n access points the user wishes to disconnect from and upon the user selecting an access point to disconnect from, without further input from the user, the computer program disconnects from the access point to disconnect from, connects to the n+1th access point and launches the further service from the n+1th access point.

10. The computer-readable medium of claim 9, wherein the program maintains (a) for each access point, an Access Point Object, wherein the Access Point Object comprises a data structure for storing information including information for connecting with the access point and information for accessing services associated with the access point; and (b) for each service, a Service Object, wherein the Service Object comprises a data structure for storing information including an access point associated with the service, and parameters for launching the service.

11. The computer-readable medium of claim 10 wherein the information for connecting with the access point and information for accessing services associated with the access point comprise: a connection address, a user ID, a password, network configuration parameters and proxy parameters.

12. The computer-readable medium of claim 10 wherein a service utilizes information stored in the Access Point Object of the Access Point associated with the service.

13. The computer-readable medium of claim 10, wherein to connect with a selected access point the program implements the steps of determining if a communication link is available;

if a communication link is available, obtaining from an Access Point Object associated with the access point and providing to the communication hardware and software, the information for connecting with the access point.

14. The computer readable medium of claim 11, wherein when a connection has been established with the access point, providing to the access point the password and the user ID associated with the Access Point Object.

15. The computer-readable medium of claim 14, wherein to launch a service, the program utilizes the parameters for launching the service associated with the service's Service Object.

16. The computer-readable medium of claim 10, wherein information stored in each Access Point Object and information stored in each Service Object comprise data previously input by a user and default data provided by the program.

17. The computer-readable medium of claim 16, wherein the program permits a user to define a new Access Point Object.

18. The computer-readable medium of claim 17, wherein the program permits a user to define a new Service Object associated with an access point object.

19. The computer-readable medium of claim 7, wherein the program further comprises an Internet browser service and wherein the user interface additionally lists the browser service associated with one or more access points which are Internet capable.

20. The computer-readable medium of claim 7, wherein the services comprise one or more of an electronic mail service and a telephone call service.

21. A computer-readable medium containing a computer program that when loaded into a computer-based system ("CBS"), the CBS comprising communication hardware and software and one or more communication links, adapts the CBS to allow a user to access services provided through access points, wherein the program provides access to the services according to the following steps:

providing the user with a user interface displaying a list of available services provided through the access points;

if a user selects from the user interface a first service provided through a first access point, then, without further input from the user, connecting to the first access point and launching the service;

if a user selects from the user interface a second service provided through the first access point while the CBS is connected to the first access point, then, without further input from the user, launching the second service;

if a user selects from the user interface a further service from a second access point while the CBS is connected to the first access point, then if a communication link is available for connection to the second access point, then, without further input from the user, connecting to the second access point and launching the further service from the second access point; otherwise, if a communication link is unavailable for connection to the second access point, then, without further input from the user, disconnecting from the first access point, connecting to the second access point and launching the further service from the second access point.

22. A programmable computer-based system ("CBS") adapted to allow a user to access services provided through access points, the CBS comprising input means, output means, a central processing unit, software, memory means, communication hardware, communication software, communication link means, for each access point, an Access Point Object, wherein the Access Point Object comprises a data structure for storing information including information for connecting with the access point and information for accessing services associated with the access point; and for each service, a Service Object, wherein the Service Object comprises a data structure for storing information including an access point associated with the service, and parameters for launching the service;

wherein the CBS is adapted to display on the output means a user interface with a list of available services provided through the access points, and wherein, if a user, using the input means, selects from the user interface a first service provided through a first access point, then, without further input from the user, the CBS connects to the first access point by providing the communication hardware and software with the information for connecting with the access point from the Access Point Object associated with the access point; and launching the service by utilizing the parameters for launching the service associated with the service's Service Object; and wherein if a user, using the input means, selects from the user interface one or more other services provided through the first access point while the CBS is connected to the first access point, then, without further input from the user, the CBS launches the one or more other services by utilizing the parameters for launching the services associated with the Service Objects of the one or more other services; and wherein if a user, using the input means, selects from the user interface a further service from a second access point while the CBS is connected to the first access point, then if a communication link means is available for connection to the second access point, without further input from the user, the CBS connects to the second access point by providing the communication hardware and software with the information for connecting with the second access point from the Access Point Object associated with the second access point; and launching the further service by utilizing the parameters for launching the service associated with the second service's Service Object;

otherwise, if a communication link means is unavailable for connection to the second access point, the CBS queries the user on the output means as to whether the user wishes to connect to the second access point or remain connected to the first access point and if the user, using the input means responds wishing to connect to the second access point, then, without further input from the user, the CBS disconnects from the first access point, and connects to the second access point by providing the communication hardware and software with the information for connecting with the second access point from the Access Point Object associated with the second access point; and launching the further service by utilizing the parameters for launching the service associated with the second service's Service Object.

* * * * *